United States Patent [19]

Takahashi

[11] Patent Number: 5,768,024
[45] Date of Patent: Jun. 16, 1998

[54] IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 541,531

[22] Filed: Oct. 10, 1995

[30] Foreign Application Priority Data

Nov. 25, 1994 [JP] Japan ............................ 6-290892

[51] Int. Cl.$^6$ ..................... G02B 27/14; G02B 13/08; G02B 17/00
[52] U.S. Cl. ..................... 359/631; 359/630; 359/668; 359/727; 359/728
[58] Field of Search .................... 359/631, 630, 359/668, 727, 728, 13, 14, 16, 19

[56] References Cited

U.S. PATENT DOCUMENTS

| | | | |
|---|---|---|---|
| 4,026,641 | 5/1977 | Bosserman et al. | 359/869 |
| 4,669,810 | 6/1987 | Wood | 340/908 |
| 4,874,214 | 10/1989 | Cheysson et al. | 359/15 |
| 5,513,041 | 4/1996 | Togino | 359/728 |
| 5,539,422 | 7/1996 | Heacock et al. | 359/631 |
| 5,546,227 | 8/1996 | Yasugaki et al. | 359/630 |

FOREIGN PATENT DOCUMENTS

| | | |
|---|---|---|
| 583 166 | 2/1994 | European Pat. Off. |
| 62-214782 | 9/1987 | Japan . |
| 3-101709 | 4/1991 | Japan . |

*Primary Examiner*—Georgia Y. Epps
*Assistant Examiner*—Jordan M. Schwartz
*Attorney, Agent, or Firm*—Cushman Darby & Cushman IP Group of Pillsbury Madison & Sutro LLP

[57] ABSTRACT

An image display apparatus, e.g. a head-mounted image display apparatus, which enables observation of a clear image at a wide field angle, and which is extremely small in size and light in weight and hence unlikely to cause the observer to be readily fatigued. The image display apparatus has an image display device (6) and an ocular optical system (7). The ocular optical system (7) has a first surface (3), a second surface (4) and a third surface (5), which are disposed in the mentioned order from the observer's eyeball (1) side. The space between the first and second surfaces (3 and 4) and the space between the second and third surfaces (4 and 5) are filled with a medium having a refractive index larger than 1. The first and second surfaces (3 and 4) have different curvatures. The second surface (4) is a reflecting or semitransparent surface which is decentered with respect to an observer's visual axis (2), and which has a concave surface directed toward the observer's eyeball (1). Light rays emanating from the image display device (6) enter the observer's eyeball (1) without forming an intermediate image. The light rays are reflected once by the second surface (4) only. Thus, light rays from the image display device (6) are refracted by the third surface (5), reflected by the second surface (4), and further refracted by the first surface (3) so as to enter the observer's eyeball (1).

17 Claims, 16 Drawing Sheets

IMAGE DISPLAY APPARATUS

BACKGROUND OF THE INVENTION

The present invention relates to an image display apparatus and, more particularly, to a head- or face-mounted image display apparatus that can be retained on the observer's head or face.

There has heretofore been known a head-mounted image display apparatus which is disclosed in Japanese Patent Application Unexamined Publication (KOKAI) No. 3-101709 (1991), and arranged as shown in FIG. 25, which illustrates an optical ray trace of the apparatus. In the conventional head-mounted image display apparatus, an image that is displayed by a two-dimensional image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 26, an image of a CRT is transmitted through a relay optical system to form an intermediate image, and the image is projected into an observer's eye by a combination of a reflection type holographic element and a combiner having a hologram surface.

Japanese Patent Application Unexamined Publication (KOKAI) No. 62-214782 (1987) discloses another type of conventional image display apparatus. As shown in FIGS. 27(a) and 27(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 28, an image of an image display device is transferred to a curved object surface by an image transfer device, and the image transferred to the object surface is projected in the air by a toric reflector.

However, an image display apparatus of the type in which an image of an image display device is relayed, as in the image display apparatuses shown in FIGS. 25 and 26, must use several lenses as a relay optical system in addition to an ocular optical system, regardless of the type of ocular optical system. Consequently, the optical path length increases, and the optical system increases in both size and weight. In a layout such as that shown in FIGS. 27(a) and 27(b), the amount to which the apparatus projects from the observer's face undesirably increases. Further, since an image display device and an illumination optical system are attached to the projecting portion of the apparatus, the apparatus becomes increasingly large in size and heavy in weight.

Since a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head, causing the observer to be readily fatigued. Further, when the observer moves or turns with the apparatus fitted to his/her head, the apparatus may collide with something. That is, it is important for a head-mounted image display apparatus to be small in size and light in weight. An essential factor in determining the size and weight of the apparatus is the layout of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 28.

SUMMARY OF THE INVENTION

In view of the above-described problems of the conventional techniques, an object of the present invention is to provide an image display apparatus, e.g. a head-mounted image display apparatus, which enables observation of a clear image at a wide field angle, and which is extremely small in size and light in weight and hence unlikely to cause the observer to be readily fatigued.

To attain the above object, the present invention provides an image display apparatus having an image display device for displaying an image, and an ocular optical system for projecting an image formed by the image display device and for leading the image into an observer's eyeball. The ocular optical system has at least three surfaces, which are defined as a first, second and third surfaces in order from the observer's eyeball side. The space between the first and second surfaces and the space between the second and third surfaces are filled with a medium having a refractive index larger than 1. The first and second surfaces have different curvatures. The second surface is a reflecting or semitransparent surface which is decentered with respect to an observer's visual axis, and which has a concave surface directed toward the observer's eyeball. Light rays emanating from the image display device enter the observer's eyeball without forming an intermediate image during travel to the observer's eyeball. The light rays are reflected once by the second surface only. The path of light rays from the image display device is refracted by the third surface, reflected by the second surface, and further refracted by the first surface so as to enter the observer's eyeball.

In addition, the present invention provides an image display apparatus having an image display device for displaying an image, and an ocular optical system for projecting an image formed by the image display device and for leading the image into an observer's eyeball. The ocular optical system has at least three surfaces, which are defined as a first, second and third surfaces in order from the observer's eyeball side. The space between the first and second surfaces and the space between the second and third surfaces are filled with a medium having a refractive index larger than 1. The first and second surfaces have different curvatures. The second surface is a reflecting or semitransparent surface which is decentered with respect to an observer's visual axis, and which has a concave surface directed toward the observer's eyeball. In addition, a first optical system having positive power is provided between the first surface and the observer's eyeball. Light rays emanating from the image display device enter the observer's eyeball without forming an intermediate image during travel to the observer's eyeball. The light rays are reflected once by the second surface only. The path of light rays from the image display device is refracted by the third surface, reflected by the second surface, and further refracted by the first surface so as to enter the observer's eyeball through the first optical system.

In addition, the present invention provides an image display apparatus having an image display device for displaying an image, and an ocular optical system for projecting an image formed by the image display device and for leading the image into an observer's eyeball. The ocular optical system has at least three surfaces, which are defined as a first, second and third surfaces in order from the observer's eyeball side. The space between the first and second surfaces and the space between the second and third surfaces are filled with a medium having a refractive index larger than 1. The first and second surfaces have different curvatures. The second surface is a reflecting or semitransparent surface which is decentered with respect to an observer's visual axis, and which has a concave surface directed toward the observer's eyeball. In addition, a second optical system is provided between the third surface and the image display device. Light rays emanating from the image display device enter the observer's eyeball without forming an intermediate image during travel to the observer's eyeball. The light rays are reflected once by the second surface only. The path of light rays from the image display device passes through the second optical system and is refracted by the third surface. Then, the ray path is reflected by the second surface and further refracted by the first surface so as to enter the observer's eyeball.

In addition, the present invention provides an image display apparatus having a face-mounted unit body having an image display device and an ocular optical system, and a support member for supporting the face-mounted unit body on the observer's head so that the face-mounted unit body is held fit to the observer's face. The image display device is disposed in front of the observer's face with a display surface thereof directed toward an observer's eyeball so that a line normal to the display surface intersects an observer's visual axis. The ocular optical system has a first surface provided at a position which faces the observer's eyeball, a second surface disposed to face the first surface such that the spacing between the first and second surfaces gradually increases toward the image display device from the observer's visual axis, and a third surface provided so that the third surface faces the display surface of the image display device, and that one end of the third surface intersects an extension of the first surface, and the other end of the third surface intersects an extension of the second surface. The ocular optical system further has a medium which is surrounded by the first, second and third surfaces, and which has a refractive index (n) larger than 1 (n>1).

The function of the image display apparatus of the present invention will be explained below. The following explanation will be made on the basis of backward ray tracing in which light rays are traced from the observer's pupil position toward the image display device for the convenience of designing the optical system.

In the present invention, first, the space formed by the first, second and third surfaces of the ocular optical system is filled with a medium having a refractive index larger than 1, thereby making it possible to correct spherical and comatic aberrations produced by the decentered second surface, and thus succeeding in providing the observer a clear observation image having a wide exit pupil diameter and a wide field angle.

In general, a concave mirror produces strong negative comatic aberration when the pupil position is away from the center of curvature as viewed from the reflecting surface of the concave mirror. To correct the strong negative comatic aberration, in the present invention, the space formed by the first, second and third surfaces of the ocular optical system is filled with a medium having a refractive index larger than 1, and at the same time, the curvatures of the first and second surfaces are made different from each other. By doing so, the height of light rays incident on the second surface can be reduced by utilizing the refraction of light ray at the first surface. Thus, we have succeeded in minimizing strong negative comatic aberration produced by the concave mirror.

It is preferable that the second surface of the ocular optical system should be decentered (i.e. the second surface should be tilted with respect to the visual axis, or the vertex of the second surface should be shifted). Decentration of the second surface causes the optical axis to be bent, thereby enabling the interference between the image display device and the observer's head to be avoided. Further, decentration of the second surface makes it possible to correct comatic aberrations asymmetrically introduced into an image which lies closer to the image display device as viewed from the visual axis and into an image which lies on the opposite side, and also enables the image display device to be disposed on a plane which is approximately perpendicular to the optical axis reflected by the second surface. This is effective when an LCD (Liquid Crystal Display) which is inferior in viewing angle characteristics is used.

Further, an observation image of the image display device is not formed in the air as a real intermediate image by a relay optical system, but projected directly into an observer's eyeball as an enlarged image, thereby enabling the observer to view the enlarged image of the image display device as a virtual image. Accordingly, the optical system can be formed from a relatively small number of optical elements. Further, since the second surface of the ocular optical system, which is a reflecting surface, can be disposed immediately in front of the observer's face in a configuration conformable to the curve of his/her face as an optical element for enlarging and projecting an observation image, the amount to which the optical system projects from the observer's face can be reduced to an extremely small value. Thus, a compact and light-weight image display apparatus can be realized.

Further, it is important that any one of the first to third surfaces of the ocular optical system should be an anamorphic surface, that is, a surface which has different curvature radii in a plane containing both the observer's visual axis and the center of the image display device and in a plane which perpendicularly intersects the plane containing both the observer's visual axis and the center of the image display device.

The above is a condition for correcting aberration occurring because the second surface is tilted with respect to the visual axis. In general, if a spherical surface is tilted, the curvature relative to light rays incident on the surface in the plane of incidence and that in a plane perpendicularly intersecting the incidence plane differ from each other. Therefore, in an ocular optical system where a reflecting surface is decentered with respect to the visual axis as in the present invention, an image on the visual axis lying in the center of the observation image is also astigmatically aberrated for the reason stated above. In order to correct the axial astigmatism, it is important that any one of the first to third surfaces of the ocular optical system should be formed so that the curvature radius in the plane of incidence and that in a plane perpendicularly intersecting the incidence plane are different from each other.

Further, it is important to satisfy the following condition:

$$f_y/f_x > 1 \quad (1)$$

where $f_y$ is the focal length of the ocular optical system in a plane which contains both the observer's visual axis and the center of the image display device, and $f_x$ is the focal length of the ocular optical system in a plane which perpendicularly intersects the plane containing both the observer's visual axis and the center of the image display device.

If any one of the surfaces of the ocular optical system is formed so that the curvature radius in the plane of incidence and that in a plane perpendicularly intersecting the incidence plane are different from each other, as has been described above, the focal length differs in the respective directions. In that case, it is important to satisfy the condition (1). If the value of $f_y/f_x$ in the condition (1) is not larger than 1, it becomes impossible to correct astigmatism occurring because the reflecting surface of the ocular optical system is tilted.

Further, it is preferable that the second surface of the ocular optical system should be an anamorphic surface having different curvatures in a plane containing both the observer's visual axis and the center of the image display device and in a plane perpendicularly intersecting that plane.

In the ocular optical system of the present invention, a principal surface having positive power is the second surface, which is a reflecting surface. By giving different curvatures to two orthogonal planes of this surface, it becomes possible to effectively correct the above-described astigmatism.

In a case where the first and third surfaces are formed into anamorphic surfaces to correct aberration occurring because the second surface, which is a reflecting surface, is tilted, if the second surface is also formed into an anamorphic surface, it is possible to effectively correct aberrations produced by other surfaces, particularly comatic aberration.

It is also important to satisfy the following condition:

$$0.5 < R_{y2}/R_{x2} < 3 \quad (2)$$

where $R_{y2}$ is the curvature radius of the second surface of the ocular optical system in a plane containing both the observer's visual axis and the center of the image display device, and $R_{x2}$ is the curvature radius of the second surface in a plane which perpendicularly intersects the plane containing both the observer's visual axis and the center of the image display device.

In order to correct aberration occurring because the second surface is tilted with respect to the observer's visual axis, it is essential to satisfy the condition (2) as well as to form the second surface into an anamorphic surface. In the ocular optical system of the present invention, a principal surface having positive power is the second surface, which is a reflecting surface. By allowing the second surface to satisfy the condition (2), the astigmatism correcting effect is enhanced to a considerable extent. In general, reflecting surfaces exhibit a larger difference in power according to the difference in curvature radius than refracting surfaces. Therefore, a significant effect is produced by making the second surface have different curvature radii in the plane of incidence and a plane perpendicularly intersecting the incidence plane.

Further, it is important for the curvature radii $R_{x2}$ and $R_{y2}$ of the second surface to satisfy the following condition:

$$1 < R_{y2}/R_{x2} < 3 \quad (3)$$

In view of the productivity and cost, it is considered preferable to form the first and third surfaces of the ocular optical system into spherical or flat surfaces. In such a case, it is possible to allow the second surface, which is a reflecting surface, to exhibit aberration correcting effect by satisfying the condition (3). If the value of $R_{y2}/R_{x2}$ in the condition (3) is not larger than the lower limit, i.e. 1, no satisfactory astigmatism correcting effect can be obtained. If the value of $R_{y2}/R_{x2}$ is not smaller than the upper limit of the condition (3), i.e. 3, the difference between the power of the ocular optical system in the plane of incidence and the power in a plane perpendicularly intersecting the incidence plane becomes excessively large, resulting in over-correction.

In a case where the first and third surfaces of the ocular optical system are formed into anamorphic surfaces to correct astigmatism occurring because the second surface, which is a reflecting surface, is tilted, there are cases where it is important for the curvature radii $R_{x2}$ and $R_{y2}$ of the second surface to satisfy the following condition:

$$0.5 < R_{y2}/R_{x2} \leq 1 \quad (4)$$

The condition (4) is effective in a case where the first or third surface is an anamorphic surface, particularly when the power of either the first or third surface in a plane containing both the observer's visual axis and the center of the image display device is larger than the power in a plane perpendicular to that plane. That is, the condition (4) is necessary to satisfy in a case where astigmatism occurring because the second surface is tilted with respect to the visual axis is corrected by another surface. Thus, by satisfying the condition (4), comatic aberration produced by the first or third surface is effectively corrected.

In order to obtain effective power distribution for the entire optical system, it is preferable to form the first, second and third surfaces of the ocular optical system into surfaces respectively having positive, positive and negative refractive powers. FIG. 24 shows the layout of the optical elements of the ocular optical system in the present invention. Referring to FIG. 24, an observer's pupil 30, an ocular optical system 31 and an image display device 32 are disposed in the mentioned order from the left to the right as viewed in the figure. The ocular optical system 31 has a first surface 41, a second surface 42 and a third surface 43, which are disposed in the mentioned order from the left.

If the ocular optical system 31 has a power distribution consisting of positive power, positive power, and negative power, the inclination u of light rays directed toward the image display device 32 decreases. Accordingly, the principal point H of the optical system shifts to a position which is closer to the pupil 30 than the ocular optical system 31. Consequently, the back focus Bf (i.e. the distance from the third surface 43 to the image display surface 32) shortens, and it becomes possible to lengthen the eye relief ER (i.e. the distance from the pupil 30 to the first surface 41). By virtue of such a long eye relief, there is no likelihood that the optical system will interfere with the observer's face, particularly his/her eye or nose.

In addition, since the first surface 41 has positive power, it is possible to lower the height of light rays at the second surface 42, which is a reflecting surface. Consequently, it becomes possible to widen the field angle. Further, since the height of extra-axial light rays at the reflecting surface can be reduced, it becomes possible to minimize comatic aberration produced by the concave mirror.

The second surface 42 is a principal reflecting surface having positive power in the ocular optical system, and it is decentered with respect to the observer's visual axis so that the image display device 32 will not interfere with the observer's face.

By providing the third surface 43 with negative power, it becomes possible to correct field curvature mainly produced by the second surface 42.

Further, it is preferable to satisfy the following condition:

$$-1 > (\phi_1 + \phi_2)/\phi_3 > -15 \quad (5)$$

where $\phi_1$, $\phi_2$ and $\phi_3$ are refractive powers of the first, second and third surfaces of the ocular optical system.

The above is a condition for obtaining the same effect as that obtained by forming the first, second and third surfaces of the ocular optical system into surfaces respectively having positive, positive and negative refractive powers. The condition (5) specifies the ratio of the sum of the powers of the first and second surfaces to the power of the third surface. By satisfying the condition (5), negative spherical aberration produced by the first and second surfaces can be effectively corrected by positive spherical aberration produced by the third surface. Further, it is possible to shift the principal point position toward the pupil side, and hence possible to ensure a sufficiently long eye relief.

The first surface of the ocular optical system is preferably a surface having a convex surface directed toward the observer's eyeball. By providing the first surface with positive power, extra-axial light rays coming out of the pupil in the backward ray tracing are refracted by the first surface so that the height of light rays at the second surface, which is a reflecting surface, can be reduced. Consequently, the field angle can be widened. Further, since the height of subordinate light rays at the reflecting surface can be reduced, it is possible to minimize higher-order comatic aberrations produced by the concave mirror.

Further, the third surface of the ocular optical system is preferably a surface having a concave surface directed toward the image display device. By providing the third surface with negative power, it becomes possible to correct field curvature mainly produced by the second surface. The second surface produces strong negative field curvature because it has positive power. The negative field curvature can be corrected by positive field curvature produced by the third surface formed as a concave surface.

Further, it is preferable to satisfy the following condition:

$$30° < \alpha < 80° \quad (6)$$

where $\alpha$ is the angle between the second surface of the ocular optical system and the visual axis in the cross-section YZ-plane (see, e.g., FIGS. 1-20) measured relative to the tangent at the point of intersection.

The condition (6) must be satisfied in order to prevent the apparatus from interfering with the observer's head. If the angle $\alpha$ is not larger than the lower limit of the condition (6), i.e. 30°, light rays reflected by the second surface are at an angle of 90° or more to the visual axis. Therefore, image-formation positions of extra-axial light rays at the upper and lower ends of the image field are exceedingly away from each other, and thus the arrangement becomes impractical. Conversely, if the angle $\alpha$ is not smaller than the upper limit of the condition (6), i.e. 80°, light rays reflected by the second surface undesirably return toward the observer's face, causing the image display device to interfere with the observer's face.

The display surface of the image display device is preferably tilted with respect to the observer's visual axis. Since the second surface, which is a reflecting surface, is tilted with respect to the visual axis, the reflected light rays vary in the image height according to the height of incident light. Therefore, the image surface may be bent with respect to the visual axis. The bend of the image surface can be corrected by tilting the display surface of the image display device with respect to the visual axis.

In the present invention, a first optical system having positive refractive power may be disposed between the ocular optical system and the observer's eyeball. The first optical system enables the beam diameter to reduce at the second surface of the ocular optical system, and hence higher-order comatic aberrations reduce. Thus, it is possible to observe an image clearly as far as the edges of the image display surface. Further, since a principal ray at the edge of the image is refracted by the first optical system having positive refractive power, the height of light rays incident on the ocular optical system can be reduced, and it becomes possible to set a larger field angle than in a case where the ocular optical system alone is used.

Further, lateral chromatic aberration can be corrected by setting different values for the Abbe's numbers of mediums constituting the first optical system having positive power and the ocular optical system.

By using a lens as the above-described first optical system, it is possible to provide an image display apparatus which enables observation of an image that is clear as far as the edges of visual field at a wide field angle, with high productivity and at reduced cost.

By decentering the first optical system with respect to the visual axis, higher-order comatic aberrations produced by the decentered second surface can be effectively corrected.

By using a cemented lens to form the first optical system, lateral chromatic aberration produced by the first optical system can be corrected; this is useful to ensure a clearer image and a wider field angle.

By cementing the first optical system to the ocular optical system, it is possible to correct lateral chromatic aberration produced by the first optical system and the ocular optical system; this is also useful to ensure a clearer image and a wider field angle.

In the image display apparatus of the present invention, as the field angle widens and the overall size reduces, the inclination angle of the concave mirror increases, and higher-order comatic aberrations occur. In addition, astigmatism that is produced by the tilt of the surface increases. Accordingly, it becomes difficult to satisfactorily correct these aberrations by the ocular optical system alone. Therefore, a second optical system is disposed between the ocular optical system and the image display device. By doing so, it becomes possible to correct aberrations produced in the ocular optical system.

Since the image display apparatus, which is mounted on the observer's head, should be disposed so that the amount to which the image display apparatus projects from the observer's face is minimized, it is better to dispose the optical system between the ocular optical system and the image display device than between the observer's eyeball and the ocular optical system. Therefore, the second optical system is disposed between the ocular optical system and the image display device, thereby making it possible to minimize the amount to which the image display apparatus projects from the observer's face.

In addition, lateral chromatic aberration can be corrected by varying the Abbe's numbers of mediums constituting the second optical system and the ocular optical system.

By combining the second optical system with the arrangement in which the first optical system is disposed between the first surface of the ocular optical system and the observer's pupil, as described above, aberration correction can be made even more effectively.

By using a lens of negative refractive power to form the second optical system, the principal point position of the optical system can be shifted closer to the pupil. Therefore, it becomes possible to ensure the required eye relief.

By disposing a lens of negative power immediately in front of the image display surface, it is possible to correct field curvature produced by the ocular optical system.

By using a lens of positive refractive power to form the second optical system, the positive power of the whole optical system is distributed to the second surface of the ocular optical system and the second optical system. Consequently, the power at the second surface becomes relatively small, and it is possible to reduce spherical and comatic aberrations produced by the reflecting surface.

By decentering the second optical system with respect to the observer's visual axis, it is possible to correct comatic aberrations asymmetrically introduced into an image which lies closer to the image display device as viewed from the visual axis and into an image which lies on the opposite side, and also possible to dispose the image display device on a plane which is approximately perpendicular to the optical axis reflected by the second surface.

By using a cemented lens to form the second optical system, lateral chromatic aberration produced by the second optical system can be corrected, and it becomes possible to observe a clear image which has minimal chromatic aberration as far as the edges of image field.

By cementing the second optical system to the third surface, lateral chromatic aberration produced by the ocular optical system and the second optical system can be corrected; this is useful to ensure a clearer image and a wider field angle. Further, even if the number of optical elements increases, the entire optical system can be arranged in a compact structure.

In the present invention, it becomes possible for the observer to view a stable observation image by providing a device for positioning both the image display device and the ocular optical system with respect to the observer's head.

By allowing both the image display device and the ocular optical system to be fitted to the observer's head with a positioning device, it becomes possible for the observer to view the observation image in a desired posture and from a desired direction.

Further, it becomes possible for the observer to view the observation image with both eyes without fatigue by providing a device for supporting at least two image display apparatuses at a predetermined spacing. Further, if images with a disparity therebetween are displayed on the right and left image display surfaces, and these images are observed with both eyes, it is possible to enjoy viewing a stereoscopic image.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 20 of the image display apparatus according to the present invention will be described below with reference to the accompanying drawings.

Figure 1:
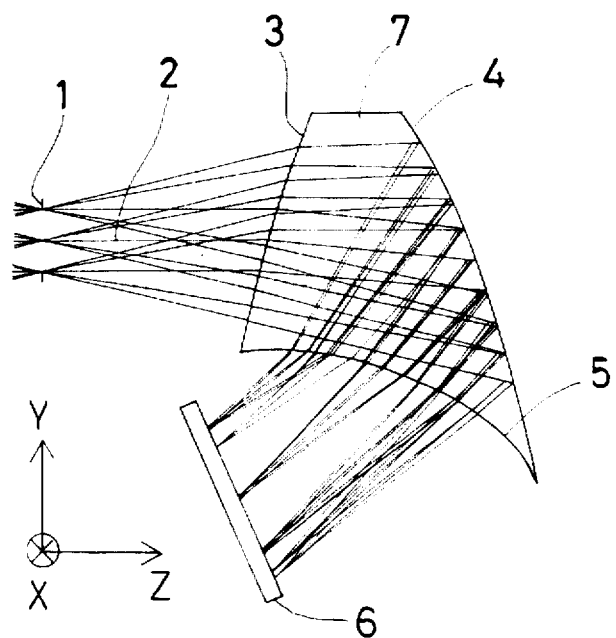
FIG. 1 is a sectional view of an image display apparatus according to Example 1 of the present invention.

Constituent parameters of Examples 1 to 20 will be shown later. It should be noted that the surface Nos. are shown as ordinal numbers in backward tracing from the observer's pupil position 1 or the position of the eyeball rolling center toward the image display device 6. In these examples, a coordinate system is defined with respect to the plane of the surface No. 1, which is the starting surface, in such a way that, as shown in FIG. 1, the direction of a visual axis passing through the center of the observer's pupil position 1 is taken as Z-axis, the plane of the drawing is taken as YZ-plane, and a plane perpendicular to the plane of the drawing and containing the Z-axis is taken as XZ-plane.

In the constituent parameters (shown later), surfaces for which eccentricities Y and Z and an inclination angle $\Theta$ are shown (nothing is shown for zero eccentricity or zero inclination angle) are those which are decentered and tilted such that the surface vertex lies at a position designated by Y and Z in a coordinate system which determines the preceding surface with the vertex thereof defined as the origin, and that the central axis of the surface concerned is tilted from the Z-axis in the coordinate system for the preceding surface by the angle $\Theta$. In this case, positive $\Theta$ means counterclockwise rotation. The rotated coordinate system (particularly the Z-axis) becomes a new coordinate system that determines the subsequent surface. Accordingly, every time the inclination angle $\Theta$ is designated, the coordinate system that determines the subsequent surface changes with regard to the Z-axis direction.

The surface separation is the distance from the vertex of the surface concerned to a reference point that determines the subsequent surface along the Z-axis in the coordinate system of the surface concerned. In a case where the surface separation is defined with respect to the preceding surface, it means, regardless of the above, that the vertex of the subsequent surface lies at a position designated by Y and Z in a coordinate system that determines the preceding surface with the reference point defined as the origin, and that the central axis of the surface is tilted from the Z-axis in the coordinate system for the preceding surface by the angle $\Theta$. In a case where neither eccentricities Y and Z nor an inclination angle $\Theta$ is shown for the subsequent surface, the vertex of the subsequent surface lies at the reference point.

In a case where a reference surface is particularly designated with regard to eccentricities Y and Z and inclination angle $\Theta$, it means that the vertex of the surface lies at a position designated by Y and Z in a coordinate system that determines the designated surface with the vertex of the designated surface defined as the origin, and that the central axis of the surface is tilted from the Z-axis in the coordinate system for the designated surface by the angle $\Theta$.

The non-rotationally symmetric aspherical configuration of each surface may be expressed by, $$Z = [(X^2/R_x) + (Y^2/R_y)]/[1 + \{1 - (1 + K_x)(X^2/R_x^2) - (1 + K_y)(Y^2/R_y^2)\}^{1/2}] + AR [(1 - AP)X^2 + (1 + AP)Y^2]^2 + BR [(1 - BP)X^2 + (1 + BP)Y^2]^3$$

where $R_y$ is the paraxial curvature radius of each surface in the YZ-plane (the plane of the figure) in the coordinate system that determines the surface; $R_x$ is the paraxial curvature radius in the XZ-plane in the coordinate system; $K_x$ is the conical coefficient in the X-direction in the coordinate system; $K_y$ is the conical coefficient in the Y-direction in the coordinate system; AR and BR are rotationally symmetric 4th- and 6th-order aspherical coefficients, respectively; and AP and BP are asymmetric 4th- and 6th-order aspherical coefficients, respectively.

The rotationally symmetric aspherical configuration of each surface may be expressed by, $$Z=[(h^2/R)]/[1+\{1-(1+K)(h^2/R^2)\}^{1/2}]+Ah^4+Bh^6(h^2=X^2+Y^2)$$

where R is the paraxial curvature radius; K is the conical coefficient; and A and B are 4th- and 6th-order aspherical coefficients, respectively.

It should be noted that the refractive index of a medium between a pair of surfaces is expressed by the refractive index for the spectral d-line.

Incidentally, all examples shown below are image display apparatuses for the right eye; an image display apparatus for the left eye can be realized by disposing all the constituent optical elements of each example in symmetric relation to the apparatus for the right eye with respect to the XZ-plane.

In actual practice, the direction in which the optical axis is bent by the ocular optical system may be either upward or sideward (rightward for the right eye) of the observer, as a matter of course.

FIGS. 1 to 18 are sectional views of image display apparatuses designed for a single eye according to Examples 1 to 18. In each sectional view, reference numeral 1 denotes an observer's pupil position, 2 an observer's visual axis, 3 a first surface of an ocular optical system, 4 a concave mirror which constitutes a second surface of the ocular optical system, 5 a third surface of the ocular optical system, and 6 an image display device. Reference numeral 7 denotes the ocular optical system having the first surface 3, the second surface 4 and the third surface 5. Reference numeral 8 denotes a first optical system, and 9 a second optical system.

In these examples, the actual path of light rays is as follows: A bundle of light rays emitted from the image display device 6 is successively subjected to (refraction), refraction, reflection, refraction, and (refraction) by (the second optical system 9), the third surface 5 of the ocular optical system 7, the second surface (concave mirror) 4, the first surface 3, and (the first optical system 8) in the mentioned order. Then, the ray bundle is projected into an observer's eyeball with the observer's iris position or eyeball rolling center as an exit pupil 1.

EXAMPLE 1

As shown in the sectional view of FIG. 1, this example comprises only the ocular optical system 7. The first surface 3, the second surface 4 and the third surface 5 have positive, positive and negative powers, respectively. All the first, second and third surfaces 3, 4 and 5 are anamorphic aspherical surfaces. In this example, the horizontal field angle is 35°, while the vertical field angle is 26.6°, and the pupil diameter is 8 millimeters.

EXAMPLE 2

Figure 2:
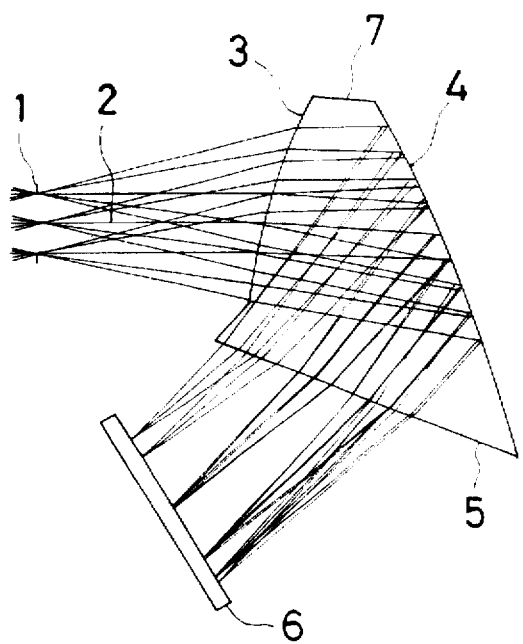
FIG. 2 is a sectional view of an image display apparatus according to Example 2 of the present invention.

As shown in the sectional view of FIG. 2, this example comprises only the ocular optical system 7. The first surface 3, the second surface 4 and the third surface 5 have positive, positive and zero powers, respectively. The first surface 3 is a spherical surface, the second surface 4 is an anamorphic aspherical surface, and the third surface 5 is a flat surface. In this example, the horizontal field angle is 35°, while the vertical field angle is 26.6°, and the pupil diameter is 8 millimeters.

EXAMPLE 3

Figure 3:
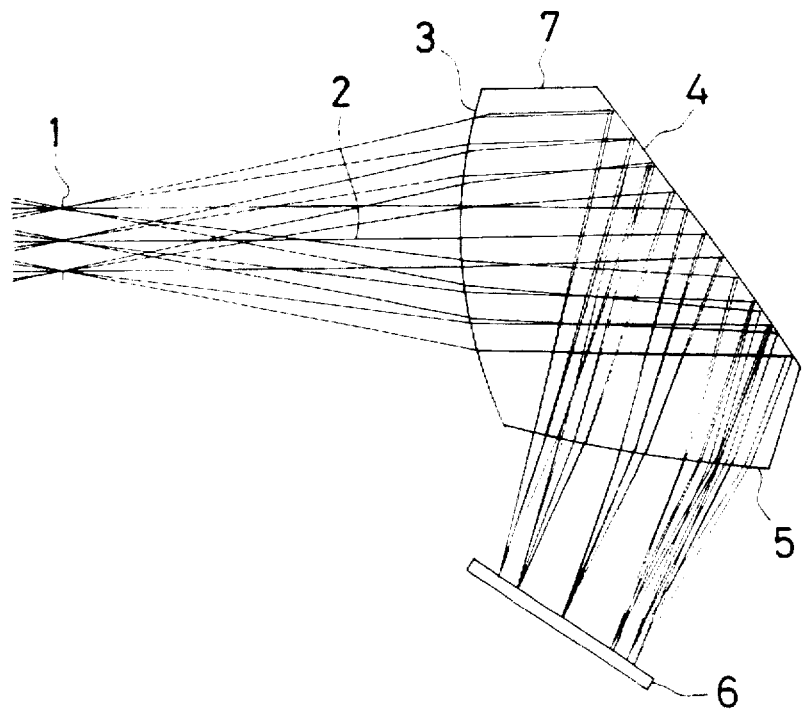
FIG. 3 is a sectional view of an image display apparatus according to Example 3 of the present invention.

As shown in the sectional view of FIG. 3, this example comprises only the ocular optical system 7. The first surface 3. the second surface 4 and the third surface 5 have positive, positive and positive powers, respectively. The first surface 3 is a spherical surface, the second surface 4 is an anamorphic aspherical surface, and the third surface 5 is a spherical surface. In this example, the horizontal field angle is 30°, while the vertical field angle is 22.7°, and the pupil diameter is 8 millimeters.

EXAMPLE 4

Figure 4:
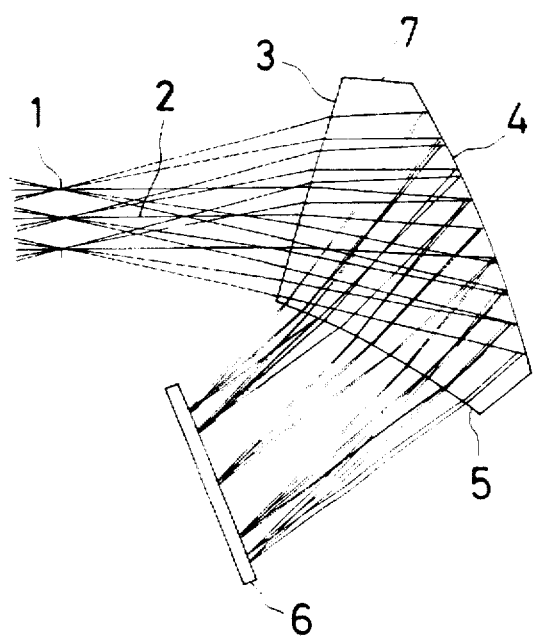
FIG. 4 is a sectional view of an image display apparatus according to Example 4 of the present invention.

As shown in the sectional view of FIG. 4, this example comprises only the ocular optical system 7. The first surface 3, the second surface 4 and the third surface 5 have positive, positive and negative powers, respectively. The first surface 3 is a toric surface, the second surface 4 is a spherical surface, and the third surface 5 is a toric surface. In this example, the horizontal field angle is 35°, while the vertical field angle is 26.6°, and the pupil diameter is 8 millimeters.

EXAMPLE 5

Figure 5:
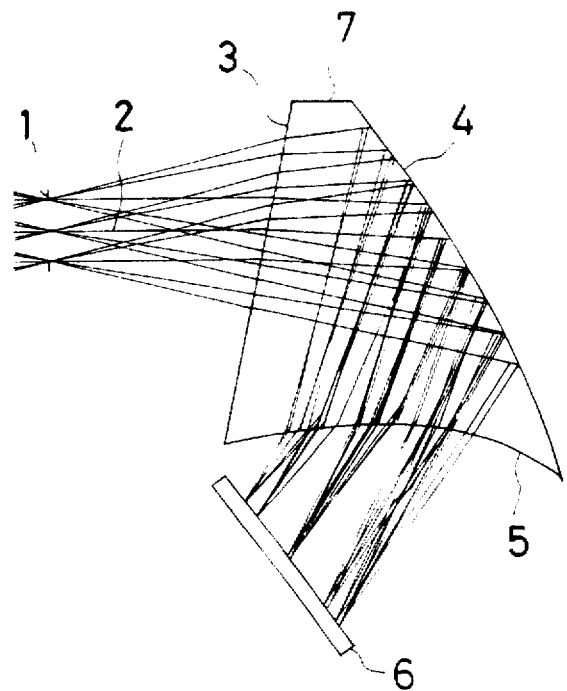
FIG. 5 is a sectional view of an image display apparatus according to Example 5 of the present invention.

As shown in the sectional view of FIG. 5, this example comprises only the ocular optical system 7. The first surface 3, the second surface 4 and the third surface 5 have zero, positive and negative powers, respectively. The first surface 3 is a flat surface, and the second and third surfaces 4 and 5 are anamorphic aspherical surfaces. In this example, the horizontal field angle is 35°, while the vertical field angle is 26.6°, and the pupil diameter is 8 millimeters.

EXAMPLE 6

Figure 6:
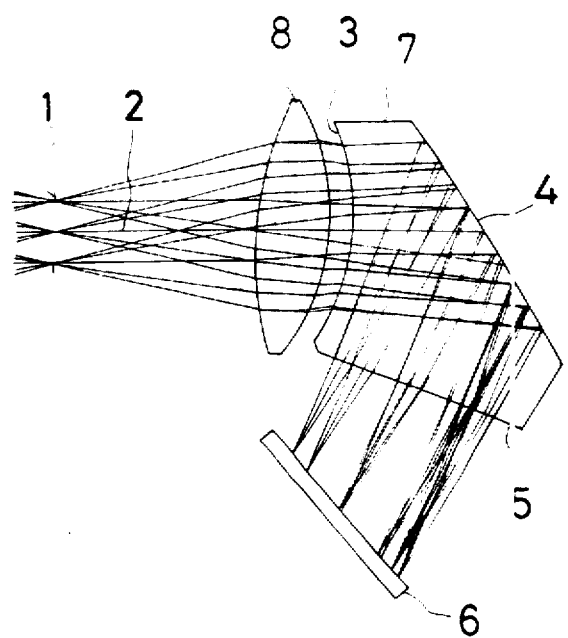
FIG. 6 is a sectional view of an image display apparatus according to Example 6 of the present invention.

As shown in the sectional view of FIG. 6, this example comprises the ocular optical system 7 and the first optical system 8. The first, second and third surfaces 3, 4 and 5 of the ocular optical system 7 have negative, positive and zero powers, respectively. The first surface 3 is a spherical surface, the second surface 4 is an anamorphic aspherical surface, and the third surface 5 is a flat surface. The first optical system 8 of positive power is formed from spherical surfaces. The first optical system 8 is disposed between the observer's pupil 1 and the first surface 3 of the ocular optical system 7 in such a manner as to be decentered with respect to the visual axis 2. In this example, the horizontal field angle is 35°, while the vertical field angle is 26.6°, and the pupil diameter is 8 millimeters.

EXAMPLE 7

Figure 7:
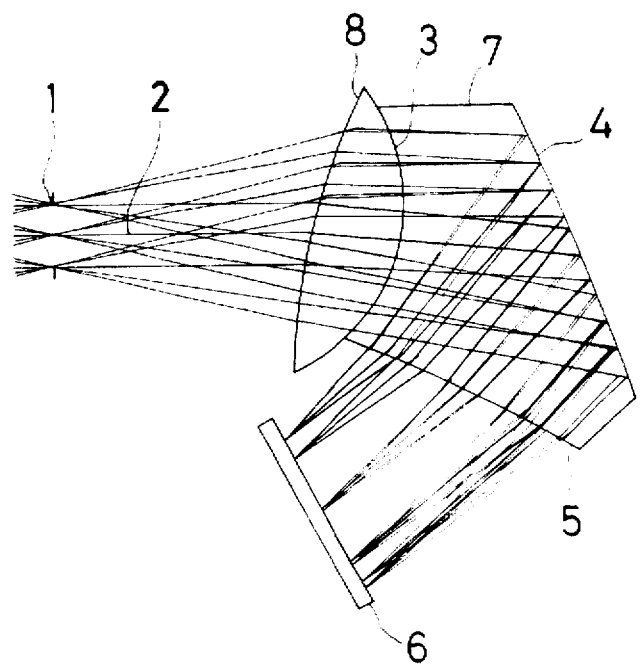
FIG. 7 is a sectional view of an image display apparatus according to Example 7 of the present invention.

As shown in the sectional view of FIG. 7, this example comprises the ocular optical system 7 and the first optical system 8. The first, second and third surfaces 3, 4 and 5 of the ocular optical system 7 have negative, positive and zero powers, respectively. The first surface 3 is a spherical surface, the second surface 4 is an anamorphic aspherical surface, and the third surface 5 is a flat surface. The first optical system 8 of positive power is formed from spherical surfaces. The first optical system 8 is cemented to the first surface 3 of the ocular optical system 7 in such a manner as to be decentered with respect to the visual axis 2. In this example, the horizontal field angle is 35°, while the vertical field angle is 26.6°, and the pupil diameter is 8 millimeters.

EXAMPLE 8

Figure 8:
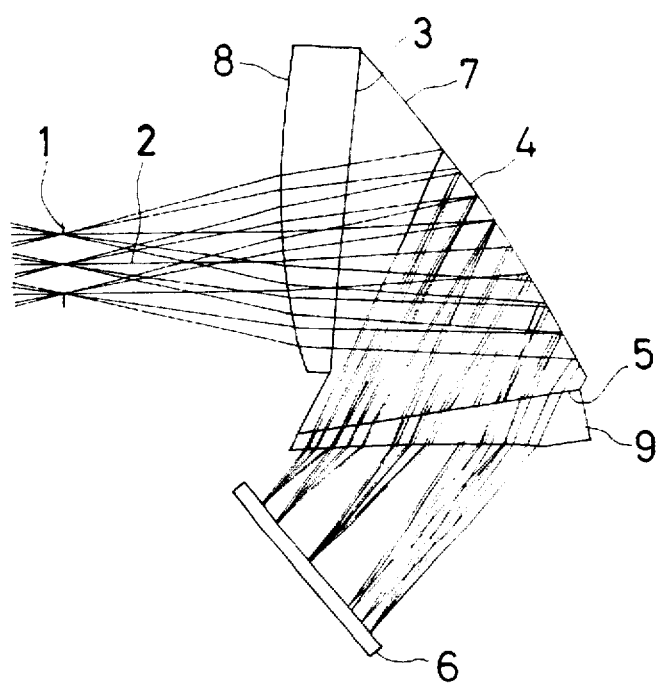
FIG. 8 is a sectional view of an image display apparatus according to Example 8 of the present invention.

As shown in the sectional view of FIG. 8, this example comprises the ocular optical system 7, the first optical system 8, and the second optical system 9. The first, second and third surfaces 3, 4 and 5 of the ocular optical system 7 have zero, positive and zero powers, respectively. The first surface 3 is a flat surface, the second surface 4 is an anamorphic aspherical surface, and the third surface 5 is a flat surface. The first optical system 8 of positive power is formed from spherical and flat surfaces. The first optical system 8 is cemented to the first surface 3 of the ocular optical system 7 in such a manner as to be decentered with respect to the visual axis 2. The second optical system 9 of negative power is formed from flat and spherical surfaces. The second optical system 9 is cemented to the third surface 5 of the ocular optical system 7 in such a manner as to be decentered with respect to the observer's visual axis. In this example, the horizontal field angle is 35°, while the vertical field angle is 26.6°, and the pupil diameter is 8 millimeters.

EXAMPLE 9

Figure 9:
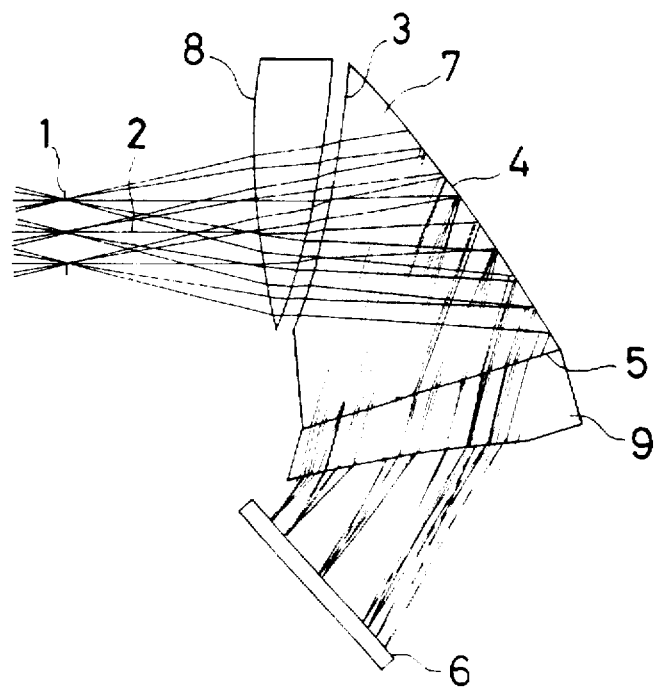
FIG. 9 is a sectional view of an image display apparatus according to Example 9 of the present invention.

As shown in the sectional view of FIG. 9, this example comprises the ocular optical system 7, the first optical system 8, and the second optical system 9. The first, second and third surfaces 3, 4 and 5 of the ocular optical system 7 have negative, positive and zero powers, respectively. The first surface 3 is a spherical surface, the second surface 4 is an anamorphic aspherical surface, and the third surface 5 is a flat surface. The first optical system 8 of positive power is formed from spherical surfaces. The first optical system 8 is disposed between the observer's pupil 1 and the first surface 3 of the ocular optical system 7 in such a manner as to be decentered with respect to the visual axis 2. The second optical system 9 of negative power is formed from flat and spherical surfaces. The second optical system 9 is cemented to the third surface 5 of the ocular optical system 7 in such a manner as to be decentered with respect to the observer's visual axis. In this example, the horizontal field angle is 35°, while the vertical field angle is 26.6°, and the pupil diameter is 8 millimeters.

EXAMPLE 10

Figure 10:
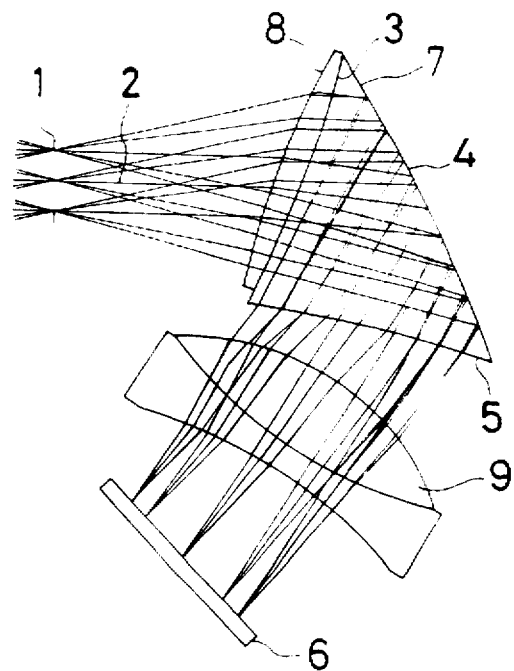
FIG. 10 is a sectional view of an image display apparatus according to Example 10 of the present invention.

As shown in the sectional view of FIG. 10, this example comprises the ocular optical system 7, the first optical system 8, and the second optical system 9. The first, second and third surfaces 3, 4 and 5 of the ocular optical system 7 have negative, positive and negative powers, respectively. The first surface 3 is a spherical surface, and the second and third surfaces 4 and 5 are anamorphic aspherical surfaces. The first optical system 8 of positive power is formed from spherical surfaces. The first optical system 8 is cemented to the first surface 3 of the ocular optical system 7 in such a manner as to be decentered with respect to the visual axis 2. The second optical system 9 of positive power is formed from a cemented lens consisting of two spherical lenses. The second optical system 9 is disposed between the third surface 5 of the ocular optical system 7 and the image display device 6 in such a manner as to be decentered with respect to the observer's visual axis. In this example, the horizontal field angle is 35°, while the vertical field angle is 26.6°, and the pupil diameter is 8 millimeters.

EXAMPLE 11

Figure 11:
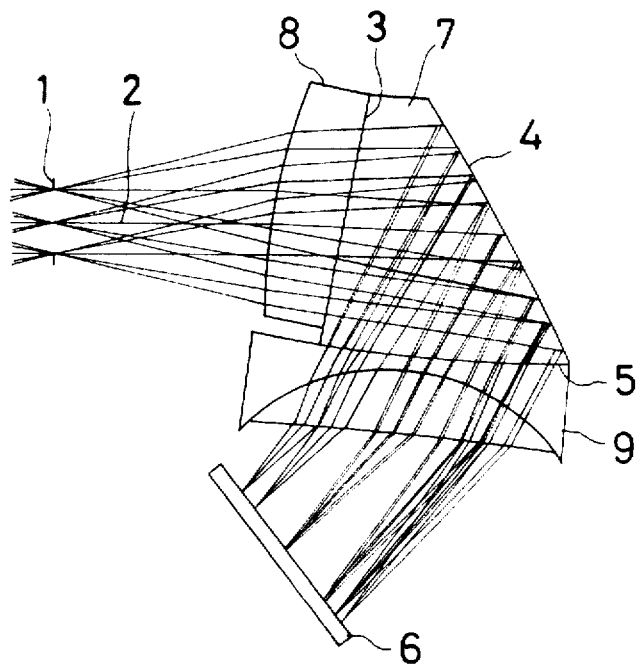
FIG. 11 is a sectional view of an image display apparatus according to Example 11 of the present invention.

As shown in the sectional view of FIG. 11, this example comprises the ocular optical system 7, the first optical system 8, and the second optical system 9. The first, second and third surfaces 3, 4 and 5 of the ocular optical system 7 have zero, positive and positive powers, respectively. The first surface 3 is a flat surface, the second surface 4 is an anamorphic aspherical surface, and the third surface 5 is a spherical surface. The first optical system 8 of positive power is formed from spherical surfaces. The first optical system 8 is cemented to the first surface 3 of the ocular optical system 7 in such a manner as to be decentered with respect to the visual axis 2. The second optical system 9 of positive power is formed from a cemented lens consisting of two spherical lenses. The second optical system 9 is cemented to the third surface 5 of the ocular optical system 7 in such a manner as to be decentered with respect to the observer's visual axis. In this example, the horizontal field angle is 35°, while the vertical field angle is 26.6°, and the pupil diameter is 8 millimeters.

EXAMPLE 12

Figure 12:
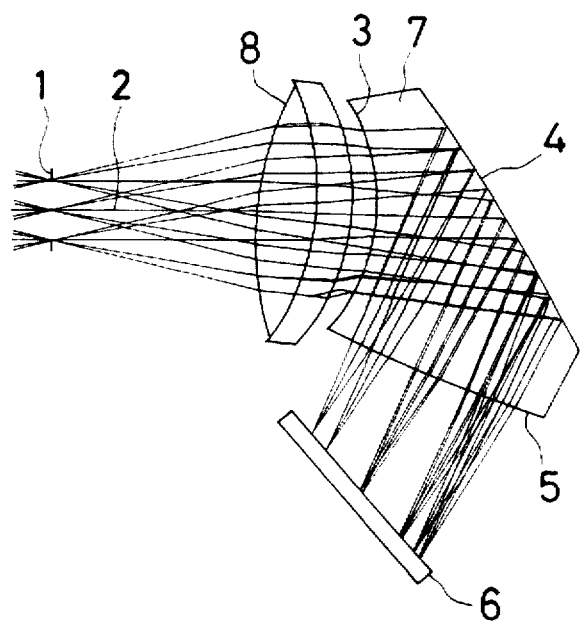
FIG. 12 is a sectional view of an image display apparatus according to Example 12 of the present invention.

As shown in the sectional view of FIG. 12, this example comprises the ocular optical system 7 and the first optical system 8. The first, second and third surfaces 3, 4 and 5 of the ocular optical system 7 have negative, positive and positive powers, respectively. The first and third surfaces 3 and 5 are spherical surfaces, and the second surface 4 is an anamorphic aspherical surface. The first optical system 8 of positive power is formed from two spherical lenses cemented together. The first optical system 8 is disposed between the observer's pupil 1 and the first surface 3 of the ocular optical system 7 in such a manner as to be decentered with respect to the visual axis 2. In this example, the horizontal field angle is 35°, while the vertical field angle is 26.6°, and the pupil diameter is 8 millimeters.

EXAMPLE 13

Figure 13:
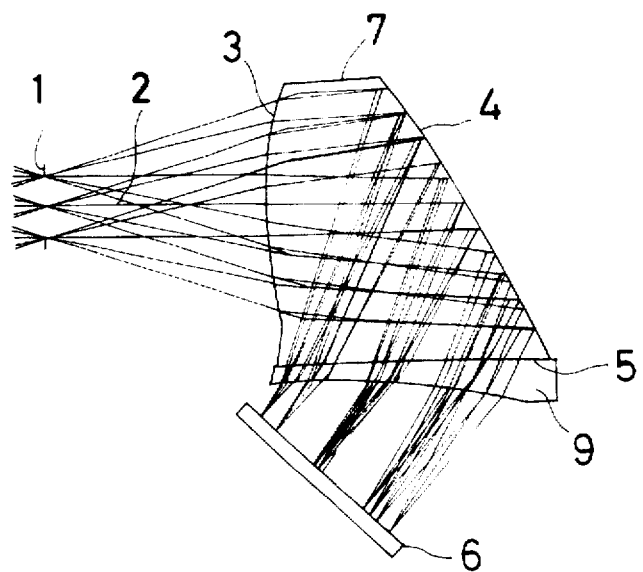
FIG. 13 is a sectional view of an image display apparatus according to Example 13 of the present invention.

As shown in the sectional view of FIG. 13, this example comprises the ocular optical system 7 and the second optical system 9. The first, second and third surfaces 3, 4 and 5 of the ocular optical system 7 have positive, positive and zero powers, respectively. The first surface 3 is a spherical surface, the second surface 4 is an anamorphic aspherical surface, and the third surface 5 is a flat surface. The second optical system 9 of negative power is formed from flat and spherical surfaces. The second optical system 9 is cemented at the flat surface side thereof to the third surface 5 of the ocular optical system 7 in such a manner as to be decentered with respect to the visual axis 2. In this example, the horizontal field angle is 45°, while the vertical field angle is 35.5°, and the pupil diameter is 8 millimeters.

EXAMPLE 14

Figure 14:
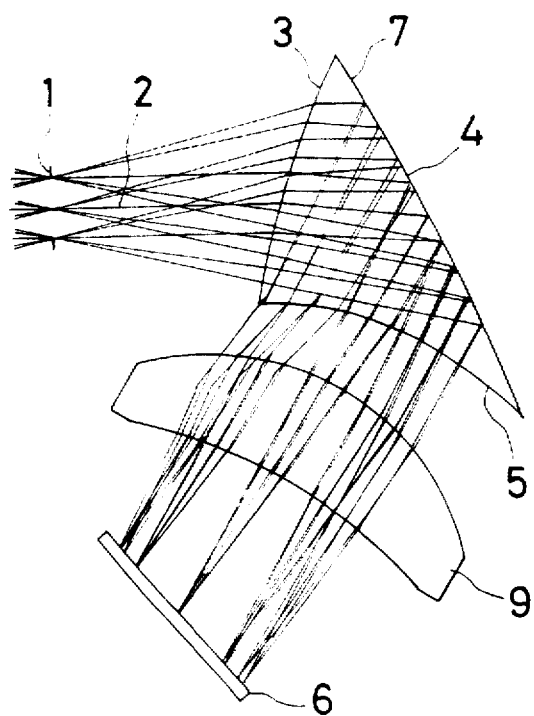
FIG. 14 is a sectional view of an image display apparatus according to Example 14 of the present invention.

As shown in the sectional view of FIG. 14, this example comprises the ocular optical system 7 and the second optical system 9. The first, second and third surfaces 3, 4 and 5 of the ocular optical system 7 have positive, positive and negative powers, respectively. The first, second and third surfaces 3, 4 and 5 are all anamorphic aspherical surfaces. The second optical system 9 of positive power is formed from spherical surfaces. The second optical system 9 is disposed between the ocular optical system 7 and the image display device 6 in such a manner as to be decentered with respect to the visual axis 2. In this example, the horizontal field angle is 35°, while the vertical field angle is 26.6°, and the pupil diameter is 8 millimeters.

EXAMPLE 15

Figure 15:
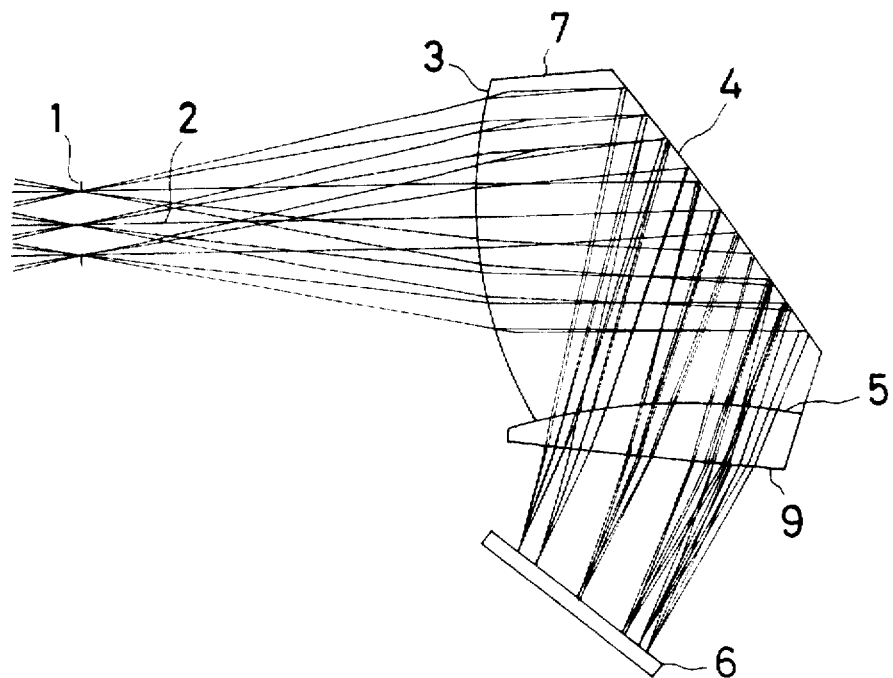
FIG. 15 is a sectional view of an image display apparatus according to Example 15 of the present invention.

As shown in the sectional view of FIG. 15, this example comprises the ocular optical system 7 and the second optical system 9. The first, second and third surfaces 3, 4 and 5 of the ocular optical system 7 have positive, positive and negative powers, respectively. The first and third surfaces 3 and 5 are spherical surfaces, and the second surface 4 is an anamorphic aspherical surface. The second optical system 9 of positive power is formed from spherical surfaces. The second optical system 9 is cemented to the third surface 5 of the ocular optical system 7 in such a manner as to be decentered with respect to the visual axis 2. In this example, the horizontal field angle is 30°, while the vertical field angle is 22.7°, and the pupil diameter is 8 millimeters.

EXAMPLE 16

Figure 16:
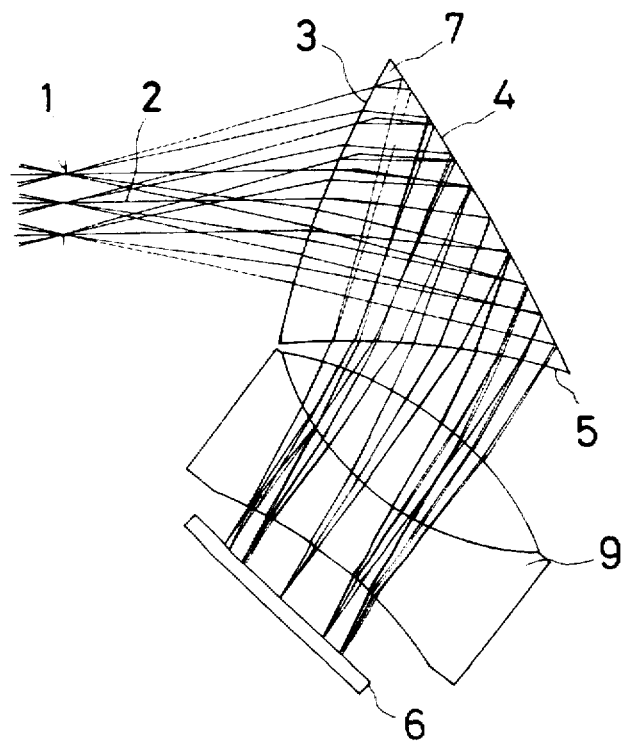
FIG. 16 is a sectional view of an image display apparatus according to Example 16 of the present invention.

As shown in the sectional view of FIG. 16, this example comprises the ocular optical system 7 and the second optical system 9. The first, second and third surfaces 3, 4 and 5 of the ocular optical system 7 have positive, positive and negative powers, respectively. The first, second and third surfaces 3, 4 and 5 are all anamorphic aspherical surfaces. The second optical system 9 of positive power is formed from two spherical lenses cemented together. The second optical system 9 is disposed between the ocular optical system 7 and the image display device 6 in such a manner as to be decentered with respect to the visual axis 2. In this example, the horizontal field angle is 35°, while the vertical field angle is 26.6°, and the pupil diameter is 8 millimeters.

EXAMPLE 17

Figure 17:
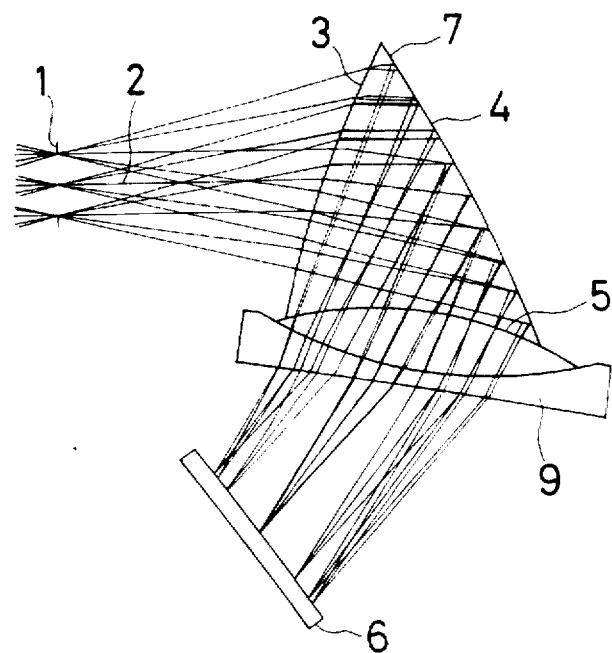
FIG. 17 is a sectional view of an image display apparatus according to Example 17 of the present invention.

As shown in the sectional view of FIG. 17, this example comprises the ocular optical system 7 and the second optical system 9. The first, second and third surfaces 3, 4 and 5 of the ocular optical system 7 have positive, positive and negative powers, respectively. The first and second surfaces 3 and 4 are anamorphic aspherical surfaces, and the third surface 5 is a spherical surface. The second optical system 9 of positive power is formed from two spherical lenses cemented together. The second optical system 9 is cemented to the ocular optical system 7 in such a manner as to be decentered with respect to the visual axis 2. In this example, the horizontal field angle is 35°, while the vertical field angle is 26.6°, and the pupil diameter is 8 millimeters.

EXAMPLE 18

Figure 18:
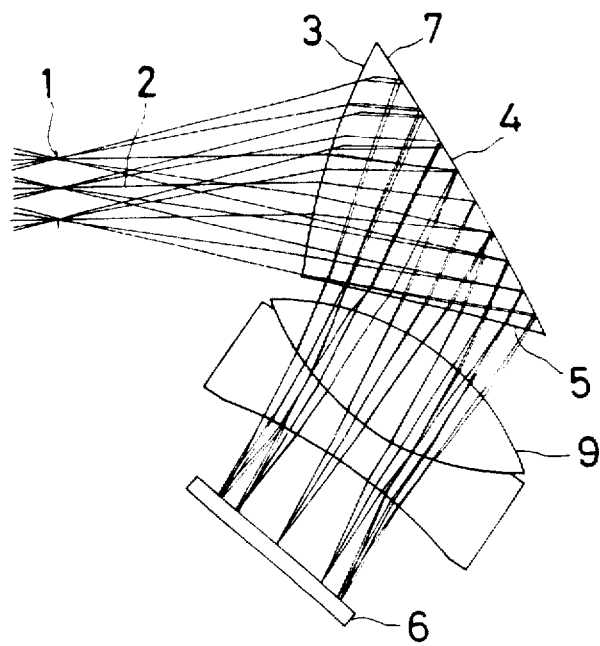
FIG. 18 is a sectional view of an image display apparatus according to Example 18 of the present invention.

As shown in the sectional view of FIG. 18, this example comprises the ocular optical system 7 and the second optical system 9. The first, second and third surfaces 3, 4 and 5 of the ocular optical system 7 have positive, positive and negative powers, respectively. The first surface 3 is an anamorphic aspherical surface, and the second and third surfaces 4 and 5 are spherical surfaces. The second optical system 9 of positive power is formed from two spherical lenses cemented together. The second optical system 9 is disposed between the ocular optical system 7 and the image display device 6 in such a manner as to be decentered with respect to the visual axis 2. In this example, the horizontal field angle is 35°, while the vertical field angle is 26.6°, and the pupil diameter is 8 millimeters.

EXAMPLE 19

Figure 19:
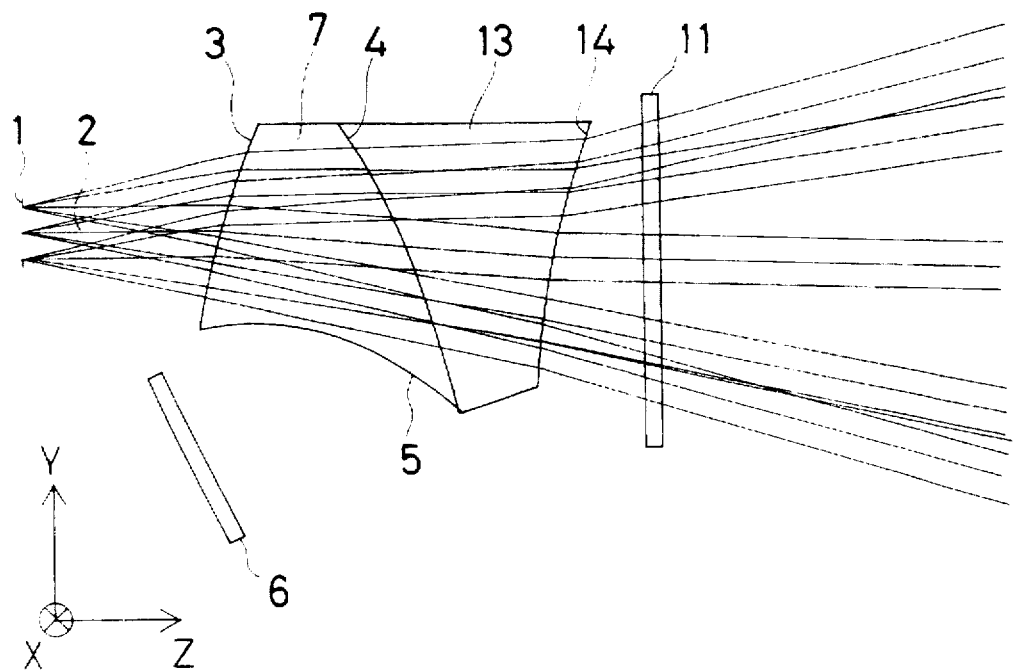
FIG. 19 is a sectional view of an image display apparatus according to Example 19 of the present invention.

In this example, as shown in the sectional view of FIG. 19, a transparent optical element 13 for providing see-through function is cemented to the outside world side of the ocular optical system 7 in Example 1 described above. The refracting surface of the transparent optical element 13 which is closer to the outside world is denoted by reference numeral 14. The optical system in this example is arranged to have substantially no refractive power with respect to a bundle of light rays from the outside world. Thus, an outside world image can be clearly observed. The surface 4 to which the transparent optical element 13 is cemented in this example is formed from a semitransparent surface which reflects a ray bundle from the image display device 6, and which transmits light from the outside world.

Further, by providing a liquid crystal shutter 11 at the outer side of the see-through transparent optical element 13, as shown in FIG. 19, three different observation conditions can be realized: When an image of the image display device 6 is to be observed, it is viewed with the liquid crystal shutter 11 closed. When an outside world image alone is to be observed, the liquid crystal shutter 11 is opened, and the image display device 6 is turned off. When the image display device 6 is turned on to display an image with the liquid crystal shutter 11 open, an outside world image can be observed superimposed on an electronic image.

Specific numerical values of the constituent parameters in this example will be shown later. Since the optical path from an LCD 6 as an image display device is the same as that in Example 1, description thereof is omitted. The numerical values (shown later) are those at the refracting surfaces with respect to a bundle of light rays from the outside world in front of the observer's eyeball. The values at the refracting surfaces are also shown in the sequence of the refracting surface 3→ the refracting surface 4→ the refracting surface 14 in backward ray tracing from the exit pupil 1 in the same way as in the other examples.

EXAMPLE 20

Figure 20:
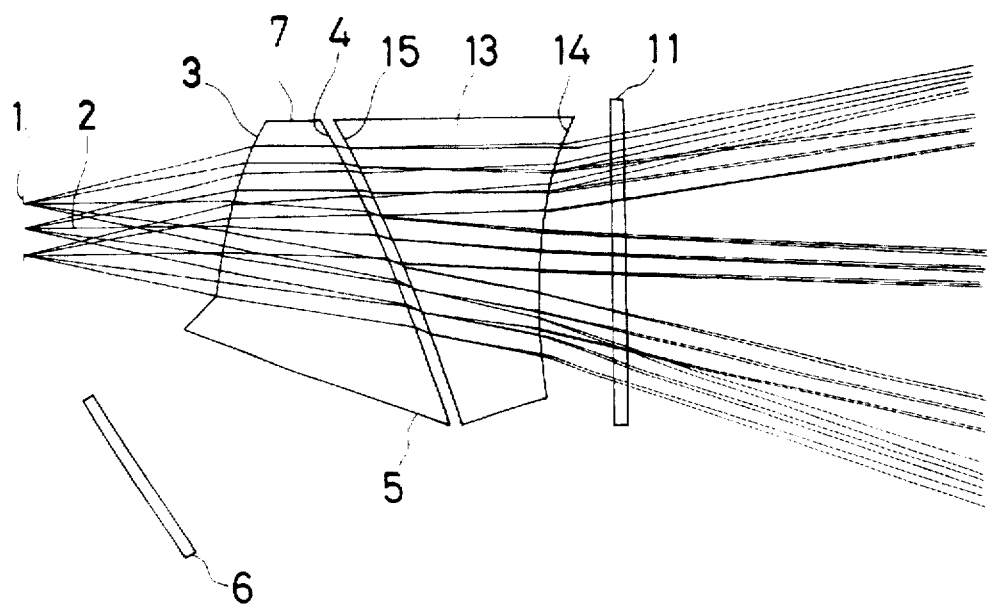
FIG. 20 is a sectional view of an image display apparatus according to Example 20 of the present invention.

In this example, as shown in the sectional view of FIG. 20, a transparent optical element 13 for providing see-through function is disposed at the outside world side of the ocular optical system 7 in the above-described Example 2 with a very narrow air spacing provided therebetween. The refracting surface of the transparent optical element 13 which is closer to the outside world is denoted by reference numeral 14, and the observer's eyeball-side refracting surface is denoted by reference numeral 15.

In this example also, the optical system is arranged to have substantially no refractive power with respect to a bundle of light rays from the outside world, in the same way as in Example 19. Thus, an outside world image can be clearly observed. The refracting surface 4 in this example is formed from a semitransparent surface which reflects a ray bundle from the image display device 6, and which transmits light from the outside world. Further, a liquid crystal shutter 11 is disposed at the outer side of the see-through transparent optical element 13.

By virtue of the above-described arrangement, three different observation conditions can be realized in the same way as in the above-described Example 19.

Specific numerical values of the constituent parameters in this example will be shown later. Since the optical path from an LCD 6 as an image display device is the same as that in Example 2, description thereof is omitted. The numerical values (shown later) are those at the refracting surfaces with respect to a bundle of light rays from the outside world in front of the observer's eyeball. The values at the refracting surfaces are also shown in the sequence of the refracting surface 3→ the refracting surface 4→ the refracting surface 15→ the refracting surface 14 in backward ray tracing from the exit pupil 1 in the same way as in the other examples.

Although in Examples 19 and 20 a prism having curved surfaces decentered with respect to the visual axis 2 is provided as the transparent optical element 13 at the outside world side of the ocular optical system 7 of the present invention in order to allow excellent see-through observation by the ocular optical system 7, it is also possible to use a Fresnel or other lens, an optical element having a diffraction optical surface, etc. The see-through transparent optical element 13 and the liquid crystal shutter 11 may be provided in any of the above-described examples.

Constituent parameters of the above-described Examples 1 to 20 will be shown below.

| Surface No. | Radius of curvature | Surface separation | Refractive index (Eccentricity) | Abbe's No. (Inclination angle) |
|---|---|---|---|---|
| Example 1 | | | | |
| 1 | ∞ (pupil) | 31.247 | | |
| 2 | $R_y$ 276.464 | 39.745 | 1.5163 | 64.15 |
| | $R_x$ 105.242 | | Y 2.792 | θ −17.70° |
| | $K_y$ 176.284 | | | |
| | $K_x$ 17.596 | | | |
| | AR 7.70344 × 10$^{-7}$ | | | |
| | BR −4.42381 × 10$^{-9}$ | | | |
| | AP 1.24899 | | | |
| | BP 9.45301 × 10$^{-2}$ | | | |
| 3 | $R_y$ −115.076 | 0 | 1.5163 | 64.15 |
| | $R_x$ −109.349 | | Y −15.00 | θ 29.85° |
| | $K_y$ −9.55591 × 10$^{-1}$ | | | |
| | $K_x$ −6.173689 | | | |
| | AR 1.52656 × 10$^{-10}$ | | | |
| | BR −2.18269 × 10$^{-13}$ | | | |
| | AP 1.56741 × 10 | | | |
| | BP −5.13958 | | | |
| 4 | $R_y$ −84.948 | 0 | (from No. 2 surface) | |
| | $R_x$ −71.864 | | Y −27.925 | θ 47.26° |
| | $K_y$ 2.690462 | | Z 10.892 | |
| | $K_x$ −3.997544 | | | |
| | AR −1.72765 × 10$^{-6}$ | | | |
| | BR 8.97516 × 10$^{-10}$ | | | |
| | AP 0.674265 | | | |
| | BP 0.108674 | | | |
| 5 | (display device) | | (from No. 1 surface) | |
| | | | Y −33.951 | θ 23.99° |
| | | | Z 26.499 | |

$f_y/f_x = 1.07$
$R_{y2}/R_{x2} = 1.05$
$(\phi_1 + \phi_2)/\phi_3 = -3.124$
$\alpha = 77.84°$

| Example 2 | | | | |
|---|---|---|---|---|
| 1 | ∞ (pupil) | 30.048 | | |
| 2 | 74.481 | 35.475 | 1.4870 | 70.40 |
| | | | Y −2.504 | θ −12.70° |
| 3 | $R_y$ −276.247 | 0 | 1.4870 | 70.40 |
| | $R_x$ −169.609 | | Y −13.949 | θ 30.00° |
| | $K_y$ 22.492490 | | | |
| | $K_x$ 4.695438 | | | |
| | AR 4.76325 × 10$^{-13}$ | | | |
| | BR 3.65877 × 10$^{-11}$ | | | |
| | AP −6.47839 × 10 | | | |
| | BP 0.25757 | | | |
| 4 | ∞ | 0 | (from No. 2 surface) | |
| | | | Y −20.901 | θ 80.93° |
| 5 | (display device) | | (from No. 1 surface) | |
| | | | Y −37.948 | θ 31.25° |
| | | | Z 17.514 | |

$f_y/f_x = 1.37$
$R_{y2}/R_{x2} = 1.63$
$(\phi_1 = \phi_2)/\phi_3 = \infty$
$\alpha = 72.70°$

| Example 3 | | | | |
|---|---|---|---|---|
| 1 | ∞ (pupil) | 53.100 | | |
| 2 | 57.295 | 30.784 | 1.51633 | 64.15 |
| 3 | $R_y$ −356.503 | 0 | | |
| | $R_x$ −233.239 | | Y 2.597 | θ 36.46° |
| | $k_y$ −51.331834 | | | |
| | $k_x$ 31.598154 | | | |
| | AR 2.34782 × 10$^{-7}$ | | | |

-continued

| Surface No. | Radius of curvature | Surface separation | Refractive index (Eccentricity) | Abbe's No. (Inclination angle) |
|---|---|---|---|---|
| | BR $7.22862 \times 10^{-11}$ | | | |
| | AP $-0.669695$ | | | |
| | AR $-0.168105$ | | | |
| 4 | 206.104 | 0 | (from No. 2 surface) | |
| | | | Y $-29.873$ | $\theta$ 83.29° |
| 5 | (display device) | | (from No. 1 surface) | |
| | | | Y $-50.724$ | $\theta$ 56.04° |
| | | | Z 67.059 | |

$f_y/f_x = 1.20$
$R_{y2}/R_{x2} = 1.53$
$(\phi_1 + \phi_2)/\phi_3 = 6.57$
$\alpha = 53.54°$ Example 4

| 1 | ∞ (pupil) | 38.060 | | |
| 2 | $R_y$ 413.784 | 26.415 | 1.4870 | 70.40 |
| | $R_x$ 100.921 | | Y 15.589 | $\theta$ $-19.27°$ |
| 3 | $-138.139$ | 0 | 1.4870 | 70.40 |
| | | | Y $-13.921$ | $\theta$ 38.00° |
| 4 | $R_y$ $-97.085$ | 0 | (from No. 2 surface) | |
| | $R_x$ $-228.894$ | | Y $-30.000$ | $\theta$ 80.00° |
| | | | Z $-11.270$ | |
| 5 | (display device) | | (from No. 1 surface) | |
| | | | Y $-35.297$ | $\theta$ 21.06° |
| | | | Z 21.066 | |

$f_y/f_x = 1.26$
$R_{y2}/R_{x2} = 1.00$
$(\phi_1 + \phi_2)/\phi_3 = -3.14$
$\alpha = 71.27°$ Example 5

| 1 | ∞ (pupil) | 30.000 | | |
| 2 | ∞ | 42.809 | 1.5163 | 64.15 |
| | | | Y $-1.557$ | $\theta$ $-13.01°$ |
| 3 | $R_y$ $-107.677$ | 0 | 1.5163 | 64.15 |
| | $R_x$ $-124.033$ | | Y $-18.916$ | $\theta$ 30.00° |
| | $K_y$ 0.713 | | | |
| | $K_x$ $-1.355$ | | | |
| | AR $3.62201 \times 10^{-10}$ | | | |
| | BR $-7.43591 \times 10^{-15}$ | | | |
| | AP 29.8897 | | | |
| | BP 6.50741 | | | |
| 4 | $R_y$ $-311.976$ | 0 | (from No. 2 surface) | |
| | $R_x$ 90.339 | | Y $-26.833$ | $\theta$ 66.13° |
| | $K_y$ 22.560 | | | |
| | $K_x$ 0 | | | |
| | AR $-7.62678 \times 10^{-7}$ | | | |
| | BR $2.08695 \times 10^{-10}$ | | | |
| | AP 1.90694 | | | |
| | BP 0.86329 | | | |
| 5 | (display device) | | (from No 1 surface) | |
| | | | Y $-43.950$ | $\theta$ 37.54° |
| | | | Z 32.513 | |

$f_y/f_x = 1.19$
$R_{y2}/R_{x2} = 0.87$
$(\phi_1 + \phi_2)/\phi_3 = -11.22$
$\alpha = 73.01°$ Example 6

| 1 | ∞ (pupil) | 28.024 | | |
| 2 | 47.970 | 9.309 | 1.6201 | 60.27 |
| | | | Y 0.232 | $\theta$ $-5.97°$ |
| 3 | $-31.146$ | 3.866 | | |
| 4 | $-26.468$ | 9.500 | 1.7550 | 27.60 |
| 5 | $R_y$ $-212.641$ | 0 | 1.7550 | 27.60 |
| | $R_x$ $-150.033$ | | Y 11.476 | $\theta$ 40.00° |
| | $K_y$ $-4.575$ | | | |
| | $K_x$ $-3.639$ | | | |
| | AR $4.83678 \times 10^{-8}$ | | | |
| | BR $1.8208 \times 10^{-11}$ | | | |
| | AP $-0.069392$ | | | |
| | BP $-0.40101$ | | | |
| 6 | ∞ | 0 | (from No. 4 surface) | |
| | | | Y $-15.089$ | $\theta$ 74.70° |
| | | | Z $-16.770$ | |
| 7 | (display device) | | (from No. 1 surface) | |
| | | | Y $-37.882$ | $\theta$ 41.01° |
| | | | Z 38.525 | |

$f_y/f_x = 1.25$
$R_{y2}/R_{x2} = 1.42$
$\alpha = 55.97°$

Example 7

| 1 | ∞ (pupil) | 34.904 | | |
| 2 | 86.297 | 11.523 | 1.6383 | 56.89 |
| | | | Y 0.673 | $\theta$ $-14.71°$ |
| 3 | $-25.358$ | 30.000 | 1.6344 | 34.94 |
| 4 | $R_y$ $-224.233$ | 0 | 1.6344 | 34.94 |
| | $R_x$ $-158.986$ | | Y $-3.951$ | $\theta$ 33.68° |
| | $K_y$ $-2.207$ | | | |
| | $K_x$ 0.088 | | | |
| | AR $1.01137 \times 10^{-7}$ | | | |
| | BR $-3.6633 \times 10^{-14}$ | | | |
| | AP $-0.194047$ | | | |
| | BP 5.65461 | | | |
| 5 | $-164.621$ | 0 | (from No. 3 surface) | |
| | | | Y $-16.498$ | $\theta$ 77.89° |
| | | | Z $-14.078$ | |
| 6 | (display device) | | (from No. 1 surface) | |
| | | | Y $-36.695$ | $\theta$ 29.01° |
| | | | Z 35.750 | |

$f_y/f_x = 1.30$
$R_{y2}/R_{x2} = 1.41$
$\alpha = 71.03°$

Example 8

| 1 | ∞ (pupil) | 30.091 | | |
| 2 | $R_y$ 83.071 | 9.022 | 1.4870 | 70.40 |
| | $R_x$ 81.196 | | Y 17.244 | $\theta$ $-6.07°$ |
| | $K_y$ $-0.0811$ | | | |
| | $K_x$ 4.590 | | | |
| | AR $-7.70164 \times 10^{-9}$ | | | |
| | BR $7.63576 \times 10^{-11}$ | | | |
| | AP $-1.06835 \times 10$ | | | |
| | BP 0.539891 | | | |
| 3 | ∞ | 24.577 | 1.5027 | 68.73 |
| 4 | $R_y$ $-198.652$ | 0 | 1.5027 | 68.73 |
| | $R_x$ $-136.845$ | | Y $-15.000$ | $\theta$ 36.92° |
| | $K_y$ 13.841 | | | |
| | $K_x$ 1.762 | | | |
| | AR $2.79908 \times 10^{-7}$ | | | |
| | BR $1.60174 \times 10^{-12}$ | | | |
| | AP $-3.18503 \times 10^{-3}$ | | | |
| | BP $-1.00853$ | | | |
| 5 | ∞ | $-1.5$ | 1.7550 | 27.60 |
| | | | (from No. 3 surface) | |
| | | | Y $-43.693$ | $\theta$ 103.95° |
| | | | Z $-41.399$ | |
| 6 | $R_y$ $-193.685$ | 0 | | |
| | $R_x$ $-138.084$ | | | |
| | $K_y$ 0.204 | | | |
| | $K_x$ 24.814 | | | |
| | AR $2.88725 \times 10^{-9}$ | | | |
| | BR $5.01773 \times 10^{-11}$ | | | |
| | AP 5.17891 | | | |
| | BP $-1.6592$ | | | |
| 7 | (display device) | | (from No. 1 surface) | |
| | | | Y $-40.715$ | $\theta$ 38.97° |
| | | | Z 32.850 | |

$f_y/f_x = 1.36$
$R_{y2}/R_{x2} = 1.45$
$\alpha = 59.15°$

Example 9

| 1 | ∞ (pupil) | 25.250 | | |
| 2 | 82.662 | 9.967 | 1.4965 | 69.36 |
| | | | Y 17.240 | $\theta$ $-4.22°$ |
| 3 | $-101.884$ | 1.967 | | |

-continued

| Surface No. | Radius of curvature | Surface separation | Refractive index (Eccentricity) | Abbe's No. (Inclination angle) |
|---|---|---|---|---|
| 4 | −101.337 | 9.500 | 1.5163 | 64.15 |
| 5 | $R_y$ −213.810 | 0 | 1.5163 | 64.15 |
| | $R_x$ −128.219 | | Y −2.364 | θ 44.85° |
| | $K_y$ 10.298 | | | |
| | $K_x$ 1.364 | | | |
| | AR 2.76231 × $10^{-7}$ | | | |
| | BR −6.66096 × $10^{-12}$ | | | |
| | AP −0.0309059 | | | |
| | BP −1.37769 | | | |
| 6 | ∞ | −5.076 | 1.7538 | 27.65 |
| | | | (from No. 4 surface) | |
| | | | Y −50.140 | θ 111.74° |
| | | | Z −31.051 | |
| 7 | −236.972 | 0 | | |
| 8 | (display device) | | (from No. 1 surface) | |
| | | | Y −44.993 | θ 43.72° |
| | | | Z 35.241 | |

$f_y/f_x = 1.53$
$R_{y2}/R_{x2} = 1.67$
$\alpha = 49.37°$

Example 10

| | | | | |
|---|---|---|---|---|
| 1 | ∞ (pupil) | 31.097 | | |
| 2 | $R_y$ 139.405 | 3.324 | 1.4896 | 70.10 |
| | $R_x$ 61.718 | | Y 3.225 | θ −19.49° |
| | $K_y$ 34.871 | | | |
| | $K_x$ 3.532 | | | |
| | AR 7.70344 × $10^{-7}$ | | | |
| | BR −4.42381 × $10^{-9}$ | | | |
| | AP 0.361603 | | | |
| | BP 0.0354448 | | | |
| 3 | −200.000 | 27.000 | 1.5163 | 64.15 |
| 4 | $R_y$ −258.516 | 0 | 1.5163 | 64.15 |
| | $R_x$ −279.493 | | Y −8.244 | θ 44.070 |
| | $K_y$ 21.058 | | | |
| | $K_x$ −3.010 | | | |
| | AR 1.75101 × $10^{-10}$ | | | |
| | BR 8.01808 × $10^{-11}$ | | | |
| | AP 18.6627 | | | |
| | BP 0.0471687 | | | |
| 5 | $R_y$ −199.068 | 0 | (from No. 3 surface) | |
| | $R_x$ −342.870 | | Y −15.332 | θ 85.138° |
| | $K_y$ −12.037572 | | | |
| | $K_x$ −453.468 | | | |
| | AR −3.09 × $10^{-7}$ | | | |
| | BR −4.98901 × $10^{-12}$ | | | |
| | AP 0.0206667 | | | |
| | BP −2.99819 | | | |
| 6 | −36.548 | −10.691 | 1.6259 | 59.12 |
| | | | (from No. 1 surface) | |
| | | | Y −25.646 | θ 58.07° |
| | | | Z 39.014 | |
| 7 | 55.628 | −3.007 | 1.7550 | 27.60 |
| 8 | (display device) | | (from No. 1 surface) | |
| | | | Y −49.246 | θ 43.56° |
| | | | Z 19.509 | |

$f_y/f_x = 1.21$
$R_{y2}/R_{x2} = 0.92$
$\alpha = 65.42°$

Example 11

| | | | | |
|---|---|---|---|---|
| 1 | ∞ (pupil) | 30.353 | | |
| 2 | 81.809 | 9.485 | 1.5518 | 64.49 |
| | | | Y 3.047 | θ −11.40° |
| 3 | ∞ | 30.000 | 1.5163 | 64.15 |
| 4 | $R_y$ −281.144 | 0 | 1.5163 | 64.15 |
| | $R_x$ −153.073 | | Y −9.677 | θ 37.33° |
| | $K_y$ 4.511 | | | |
| | $K_x$ −2.620 | | | |
| | AR −3.17464 × $10^{-11}$ | | | |
| | BR −1.06044 × $10^{-14}$ | | | |

-continued

| Surface No. | Radius of curvature | Surface separation | Refractive index (Eccentricity) | Abbe's No. (Inclination angle) |
|---|---|---|---|---|
| | AP −13.484 | | | |
| | BP 8.57385 | | | |
| 5 | 191.029 | −2.110 | 1.6666 | 32.34 |
| | | | (from No. 3 surface) | |
| | | | Y −16.991 | θ 95.56° |
| 6 | −27.157 | −8.164 | 1.7440 | 44.70 |
| 7 | −453.659 | 0 | | |
| | K 111.826 | | | |
| | A −4.94954 × $10^{-7}$ | | | |
| | B 8.70349 × $10^{-11}$ | | | |
| 8 | (display device) | | (from No. 1 surface) | |
| | | | Y −43.506 | θ 38.91° |
| | | | Z 32.012 | |

$f_y/f_x = 1.47$
$R_{y2}/R_{x2} = 1.84$
$\alpha = 64.08°$

Example 12

| | | | | |
|---|---|---|---|---|
| 1 | ∞ (pupil) | 28.009 | | |
| 2 | 43.771 | 7.450 | 1.6022 | 61.25 |
| | | | Y 0 | θ −5.85° |
| 3 | −36.941 | 4.854 | 1.5356 | 65.74 |
| 4 | −30.202 | 3.675 | | |
| 5 | −25.618 | 9.500 | 1.7550 | 27.60 |
| 6 | $R_y$ −211.455 | 0 | 1.7550 | 27.60 |
| | $R_x$ −149.472 | | Y 11.733 | θ 40.00° |
| | $K_y$ −5.135 | | | |
| | $K_x$ −3.989 | | | |
| | AR 4.36042 × $10^{-8}$ | | | |
| | BR 1.60262 × $10^{-11}$ | | | |
| | AP −0.116601 | | | |
| | BP −0.28892 | | | |
| 7 | 573.387 | 0 | (from No. 5 surface) | |
| | | | Y −14.924 | θ 72.46° |
| | | | Z −15.576 | |
| 8 | (display device) | | (from No. 1 surface) | |
| | | | Y −37.262 | θ 41.77° |
| | | | Z 42.032 | |

$f_y/f_x = 1.23$
$R_{y2}/R_{x2} = 1.41$
$\alpha = 55.84°$

Example 13

| | | | | |
|---|---|---|---|---|
| 1 | ∞ (pupil) | 30.000 | | |
| 2 | 50.215 | 30.352 | 1.5163 | 64.15 |
| 3 | $R_y$ −172.842 | 0 | 1.5163 | 64.15 |
| | $R_x$ −120.499 | | Y −6.288 | θ 30.00° |
| | $K_y$ 9.571582 | | | |
| | $K_x$ 3.09809 | | | |
| | AR 6.31318 × $10^{-7}$ | | | |
| | BR 7.77737 × $10^{-11}$ | | | |
| | AP −0.125979 | | | |
| | BP −0.152575 | | | |
| 4 | ∞ | −2.000 | 1.7550 | 27.60 |
| | | | (from No. 2 surface) | |
| | | | Y −20.911 | θ 91.19° |
| | | | Z −23.819 | |
| 5 | −116.435 | 0 | | |
| 6 | (display device) | | (from No. 1 surface) | |
| | | | Y −34.708 | θ 48.86° |
| | | | Z 37.379 | |

$f_y/f_x = 1.31$
$R_{y2}/R_{x2} = 1.43$
$\alpha = 60.00°$

Example 14

| | | | | |
|---|---|---|---|---|
| 1 | ∞ (pupil) | 32.585 | | |
| 2 | $R_y$ 145.095 | 31.907 | 1.4870 | 70.40 |
| | $R_x$ 109.066 | | Y 3.225 | θ −19.49° |
| | $K_y$ 50.659 | | | |
| | $K_x$ 8.645 | | | |
| | AR 7.77034 × $10^{-7}$ | | | |
| | BR −4.42381 × $10^{-9}$ | | | |
| | AP 1.29734 | | | |
| | BP 0.366886 | | | |
| 3 | $R_y$ −236.303 | 0 | 1.4870 | 70.40 |

-continued

| Surface No. | Radius of curvature | Surface separation | Refractive index (Eccentricity) | Abbe's No. (Inclination angle) |
|---|---|---|---|---|
|  | $R_x$ −271.086 |  | Y −11.811 | θ 41.94° |
|  | $K_y$ 15.028 |  |  |  |
|  | $K_x$ 21.498 |  |  |  |
|  | AR 1.67678 × $10^{-10}$ |  |  |  |
|  | BR 5.39271 × $10^{-11}$ |  |  |  |
|  | AP 2.51861 |  |  |  |
|  | BP 0.334236 |  |  |  |
| 4 | $R_y$ −40.759 | 0 | (from No. 2 surface) |  |
|  | $R_x$ −135.367 |  | Y −24.833 | θ 48.01° |
|  | $K_y$ −1.942474 |  | Z 12.524 |  |
|  | $K_x$ −57.305 |  |  |  |
|  | AR −2.47132 × $10^{-6}$ |  |  |  |
|  | BR −1.45235 × $10^{-11}$ |  |  |  |
|  | AP 0.381923 |  |  |  |
|  | BP −3.39339 |  |  |  |
| 5 | −35.462 | −14.000 | 1.6214 | 60.00 |
|  |  |  | (from No. 1 surface) |  |
|  |  |  | Y −25.646 | θ 58.07° |
|  |  |  | Z 39.014 |  |
| 6 | −71.958 | 0 |  |  |
| 7 | (display device) |  | (from No. 1 surface) |  |
|  |  |  | Y −54.687 | θ 39.72° |
|  |  |  | Z 16.376 |  |

$f_y/f_x = 1.45$
$R_{y2}/R_{x2} = 0.87$
$\alpha = 67.55°$

Example 15

| 1 | ∞ (pupil) | 53.100 |  |  |
| 2 | 57.773 | 30.279 | 1.5046 | 68.53 |
| 3 | $R_y$ −313.753 | 0 | 1.5046 | 68.53 |
|  | $R_x$ −198.345 |  | Y 2.651 | θ 36.34° |
|  | $K_y$ −28.703 |  |  |  |
|  | $K_x$ 22.001 |  |  |  |
|  | AR 2.3892 × $10^{-7}$ |  |  |  |
|  | BR 6.42789 × $10^{-11}$ |  |  |  |
|  | AP −0.596766 |  |  |  |
|  | BP −0.434327 |  |  |  |
| 4 | −81.742 | −8.179 | 1.4870 | 70.40 |
|  |  |  | (from No. 2 surface) |  |
|  |  |  | Y −25.838 | θ 84.09° |
|  |  |  | Z 4.829 |  |
| 5 | 830.592 | 0 |  |  |
| 6 | (display device) |  | (from No. 1 surface) |  |
|  |  |  | Y −50.879 | θ 50.89° |
|  |  |  | Z 65.919 |  |

$f_y/f_x = 1.27$
$R_{y2}/R_{x2} = 1.58$
$\alpha = 53.66°$

Example 16

| 1 | ∞ (pupil) | 37.413 |  |  |
| 2 | $R_y$ 149.929 | 39.526 | 1.5919 | 61.85 |
|  | $R_x$ 58.77 |  | Y 3.490 | θ −25.40° |
|  | $K_y$ 29.902 |  |  |  |
|  | $K_x$ 2.230 |  |  |  |
|  | AR 7.56485 × $10^{-7}$ |  |  |  |
|  | BR −2.2239 × $10^{-9}$ |  |  |  |
|  | AP 0.325219 |  |  |  |
|  | BP −0.033102 |  |  |  |
| 3 | $R_y$ −226.132 | 0 | 1.5919 | 61.85 |
|  | $R_x$ −255.234 |  | Y −12.092 | θ 48.12° |
|  | $K_y$ 5.585 |  |  |  |
|  | $K_x$ −27.508 |  |  |  |
|  | AR 1.35684 × $10^{-10}$ |  |  |  |
|  | BR 1.61885 × $10^{-11}$ |  |  |  |
|  | AP 15.2035 |  |  |  |
|  | BP 0.111233 |  |  |  |
| 4 | $R_y$ −100.909 | 0 | 1.5919 | 61.85 |
|  | $R_x$ −123.857 |  | (from No. 2 surface) |  |
|  | $K_y$ −1.092337 |  | Y −12.873 | θ 79.67° |
|  | $K_x$ −26.047854 |  | Z 30.820 |  |
|  | AR −4.88626 × $10^{-7}$ |  |  |  |
|  | BR 1.75231 × $10^{-11}$ |  |  |  |
|  | AP −0.407978 |  |  |  |
|  | BP −1.16031 |  |  |  |
| 5 | −46.552 | −13.041 | 1.5900 | 61.96 |
|  |  |  | (from No. 1 surface) |  |
|  |  |  | Y −30.332 | θ 50.87° |
|  |  |  | Z 50.335 |  |
| 6 | 35.406 | −10.000 | 1.7550 | 27.60 |
| 7 | −62.325 | 0 |  |  |
| 8 | (display device) |  | (from No. 1 surface) |  |
|  |  |  | Y −53.275 | θ 45.89° |
|  |  |  | Z 28.762 |  |

$f_y/f_x = 1.60$
$R_{y2}/R_{x2} = 0.89$
$\alpha = 67.28°$

Example 17

| 1 | ∞ (pupil) | 37.065 |  |  |
| 2 | $R_y$ 132.871 | 29.174 | 1.5163 | 64.15 |
|  | $R_x$ 62.737 |  | Y 2.631 | θ −22.08° |
|  | $K_y$ 27.156 |  |  |  |
|  | $K_x$ 1.146 |  |  |  |
|  | AR 7.39961 × $10^{-8}$ |  |  |  |
|  | BR −1.51681 × $10^{-9}$ |  |  |  |
|  | AP 1.89107 |  |  |  |
|  | BF 0.326147 |  |  |  |
| 3 | $R_y$ −235.809 | 0 | 1.5163 | 64.15 |
|  | $R_x$ −178.414 |  | Y −6.897 | θ 46.00° |
|  | $K_y$ 13.089 |  |  |  |
|  | $K_x$ −15.704 |  |  |  |
|  | AR 3.2092 × $10^{-12}$ |  |  |  |
|  | BR 4.84694 × $10^{-11}$ |  |  |  |
|  | AP 7.96135 |  |  |  |
|  | BP 0.179971 |  |  |  |
| 4 | −52.251 | −8.000 | 1.6219 | 59.91 |
|  |  |  | (from No. 2 surface) |  |
|  |  |  | Y −14.166 | θ 102.72° |
|  |  |  | Z −9.241 |  |
| 5 | 53.204 | −1.424 | 1.7550 | 27.60 |
| 6 | −759.286 | 0 |  |  |
| 7 | (display device) |  | (from No. 1 surface) |  |
|  |  |  | Y −46.083 | θ 36.92° |
|  |  |  | Z 26.956 |  |

$f_y/f_x = 1.47$
$R_{y2}/R_{x2} = 1.32$
$\alpha = 66.08°$

Example 18

| 1 | ∞ (pupil) | 37.882 |  |  |
| 2 | $R_y$ 82.505 | 35.426 | 1.6479 | 55.31 |
|  | $R_x$ 55.304 |  | Y 4.614 | θ −19.24° |
|  | $K_y$ 7.482 |  |  |  |
|  | $K_x$ 1.079 |  |  |  |
|  | AR −5.76586 × $10^{-7}$ |  |  |  |
|  | BR −9.41749 × $10^{-10}$ |  |  |  |
|  | AP 0.0278216 |  |  |  |
|  | BP 0.271564 |  |  |  |
| 3 | −339.501 | 0 | 1.6479 | 55.31 |
|  |  |  | Y −14.928 | θ 44.65° |
| 4 | −338.328 | 0 | (from No. 2 surface) |  |
|  |  |  | Y −14.444 | θ 92.37° |
|  |  |  | Z −3.737 |  |
| 5 | −34.866 | −13.520 | 1.4870 | 70.40 |
|  |  |  | (from No. 1 surface) |  |
|  |  |  | Y −21.358 | θ 54.65° |
|  |  |  | Z 50.128 |  |
| 6 | 35.818 | −5.598 | 1.7550 | 27.61 |
| 7 | −76.565 | 0 |  |  |
| 8 | (display device) |  | (from No. 1 surface) |  |
|  |  |  | Y −47.668 | θ 49.44° |
|  |  |  | Z 29.711 |  |

$f_y/f_x = 1.24$
$R_{y2}/R_{x2} = 1.00$
$\alpha = 64.59°$

-continued

| Surface No. | Radius of curvature | Surface separation | Refractive index (Eccentricity) | Abbe's No. (Inclination angle) |
|---|---|---|---|---|
| Example 19 | | | | |
| 1 | ∞ (pupil) | 31.247 | | |
| 2 | $R_y$ 276.464 | 39.745 | 1.5163 | 64.15 |
|   | $R_x$ 105.242 | | Y 2.792 | θ −17.70° |
|   | $K_y$ 176.284 | | | |
|   | $K_x$ 17.596 | | | |
|   | AR 7.70344 × $10^{-7}$ | | | |
|   | BR −4.42381 × $10^{-9}$ | | | |
|   | AP 1.24899 | | | |
|   | BP 9.45301 × $10^{-2}$ | | | |
| 3 | $R_y$ −115.076 | 10.000 | 1.5163 | 64.15 |
|   | $R_x$ −109.349 | | Y −15.00 | θ 29.85° |
|   | $K_y$ −9.55591 × $10^{-1}$ | | | |
|   | $K_x$ −6.173689 | | | |
|   | AR 1.52656 × $10^{-10}$ | | | |
|   | BR −2.18269 × $10^{-13}$ | | | |
|   | AP 1.56741 × 10 | | | |
|   | BP −5.13958 | | | |
| 4 | $R_y$ 276.464 | 20.000 | Y 8.000 | θ 5.00° |
|   | $R_x$ 105.242 | | | |
|   | $K_y$ 176.284 | | | |
|   | $K_x$ 17.596 | | | |
|   | AR 7.70344 × $10^{-7}$ | | | |
|   | BR −4.42381 × $10^{-9}$ | | | |
|   | AP 1.24899 | | | |
|   | BP 9.45301 × $10^{-2}$ | | | |
| 5 | (shutter) | | | |
| Example 20 | | | | |
| 1 | ∞ (pupil) | 30.048 | | |
| 2 | 74.481 | 35.475 | 1.4870 | 70.40 |
|   | | | Y −2.504 | θ −12.70° |
| 3 | $R_y$ −276.247 | 2.000 | Y −13.949 | θ 30.00° |
|   | $R_x$ −169.609 | | | |
|   | $K_y$ 22.492490 | | | |
|   | $K_x$ −4.695438 | | | |
|   | AR 4.76325 × $10^{-13}$ | | | |
|   | BR 3.65877 × $10^{-11}$ | | | |
|   | AP −6.47839 × 10 | | | |
|   | BP 0.25757 | | | |
| 4 | $R_y$ −276.247 | 10.000 | 1.4870 | 70.40 |
|   | $R_x$ −169.609 | | Y −13.949 | θ 30.00° |
|   | $K_y$ 22.492490 | | | |
|   | $K_x$ −4.695438 | | | |
|   | AR 4.76325 × $10^{-13}$ | | | |
|   | BR 3.65877 × $10^{-11}$ | | | |
|   | AP −6.47839 × 10 | | | |
|   | BP 0.25757 | | | |
| 5 | 74.481 | 20.000 | 1.4870 | 70.40 |
|   | | | Y 15.000 | θ 0.00° |
| 6 | (shutter) | | | |

Figure 21A:
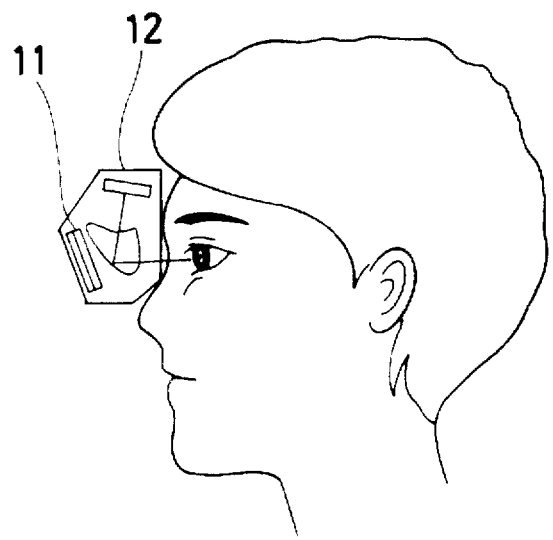
FIGS. 21(a) and 21(b) are sectional and perspective views of a head-mounted image display apparatus according to the present invention.
Figure 21B:
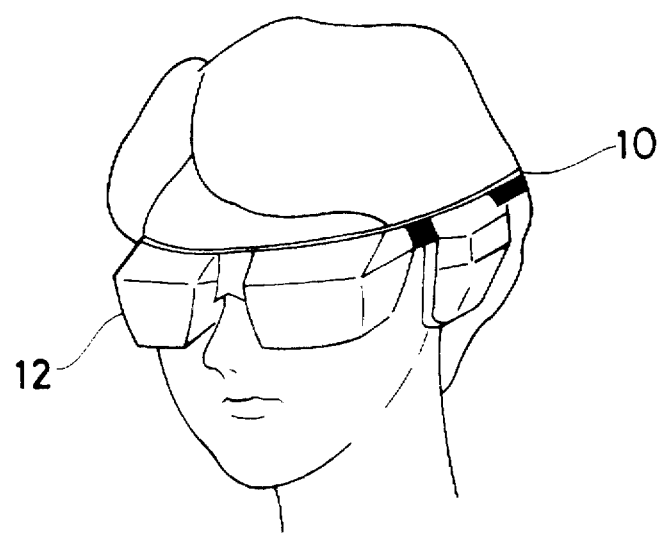
Figure 22:
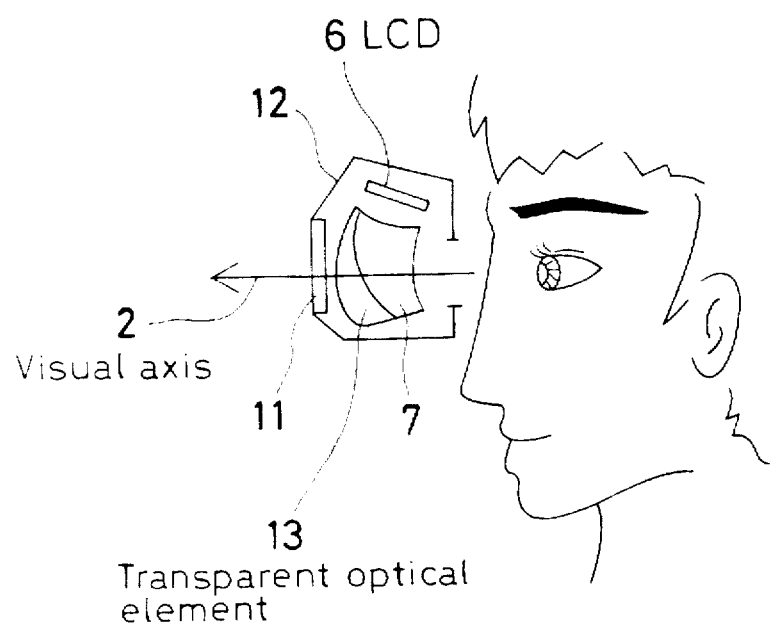
FIG. 22 is a sectional view of a modification of the head-mounted image display apparatus according to the present invention.

Although the image display apparatus of the present invention has been described by way of Examples, it should be noted that the present invention is not necessarily limited to these Examples, and that various changes and modifications may be imparted thereto. For example, the image display apparatus of the present invention may be arranged in the form of a head-mounted image display apparatus (HMD) 50 as shown in FIG. 21(a), which is a sectional view, and in FIG. 21(b), which is a perspective view. In this case, a pair of left and right HMDs 12 are fixedly supported with the distance therebetween matched with the interpupillary distance (i.e. the distance between the left and right eyes), and a headband 10, for example, is attached to the HMDs 12. In actual use, the observer wears the system on his/her head by using the headband 10. In this example of use, each HMD 12 may be arranged such that the second surface 2 of the ocular optical system is formed by using a semitransparent mirror (half-mirror), and the liquid crystal shutter 11 is provided in front of the half-mirror, thereby enabling an outside world image to be selectively observed or superimposed on the image of the image display device by opening the shutter. FIG. 22 shows an arrangement corresponding to the arrangement shown in FIG. 21(a), in which a see-through transparent optical element 13 is cemented to or disposed at the outside world side of the ocular optical system 7 with a very narrow spacing provided therebetween (Examples 19 and 20).

Figure 23:
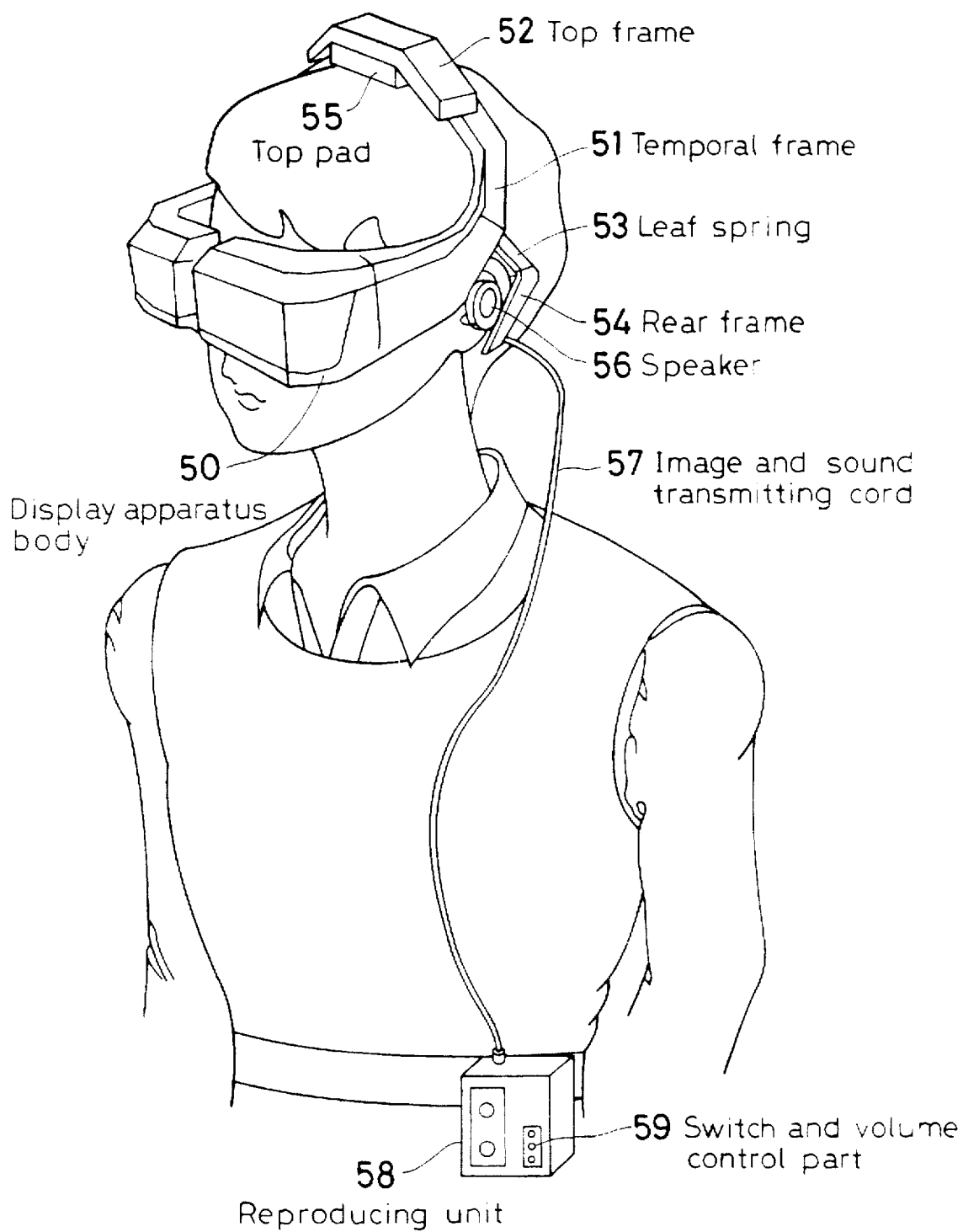
FIG. 23 shows the whole arrangement of one example of a portable image display apparatus according to the present invention.
Figure 24:
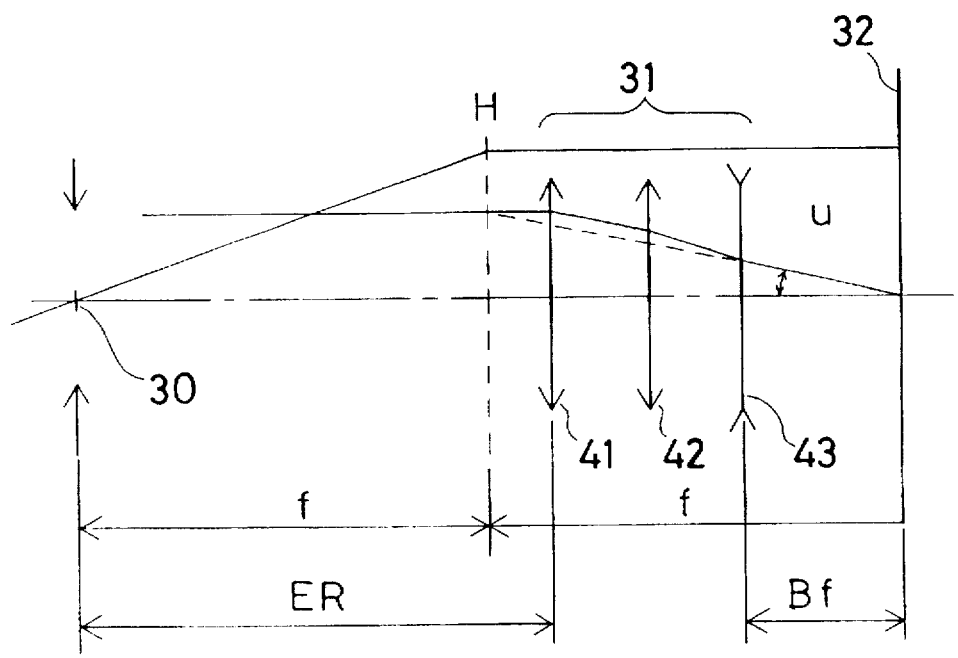
FIG. 24 shows the layout of optical elements of an ocular optical system in the present invention.
Figure 25:
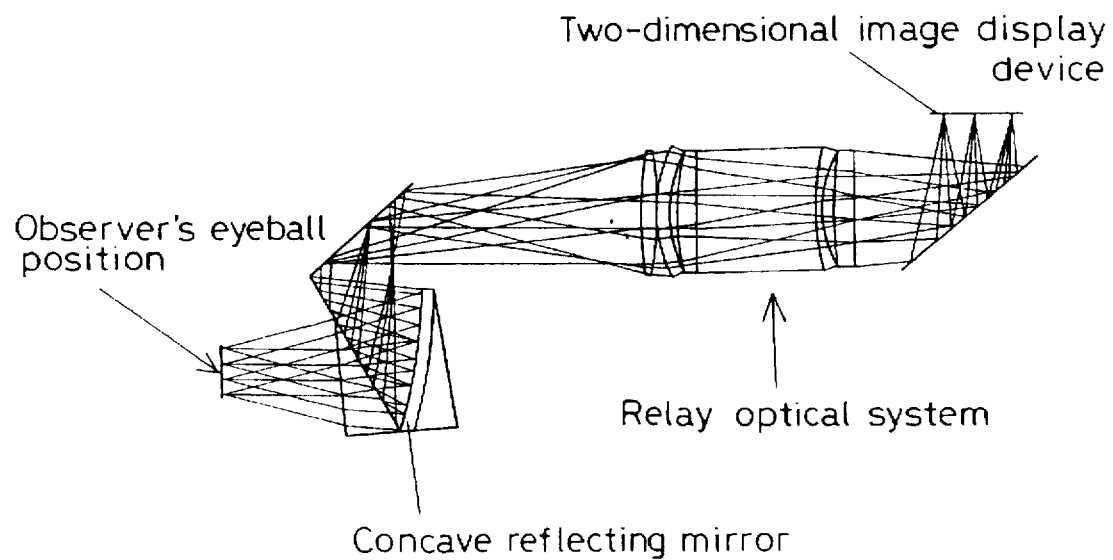
FIG. 25 shows the optical system of a conventional image display apparatus.
Figure 26:
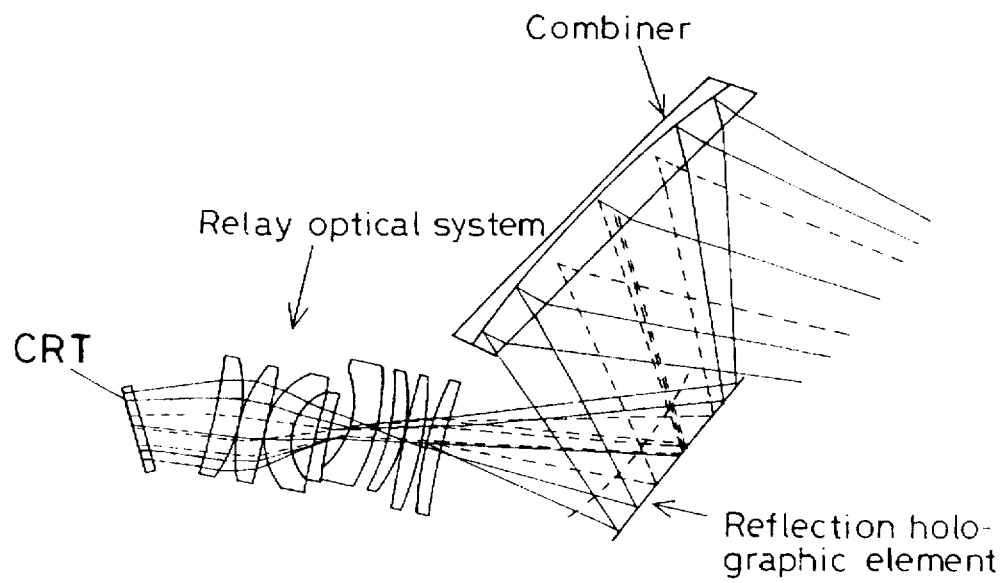
FIG. 26 shows the optical system of another conventional image display apparatus.
Figure 27A:
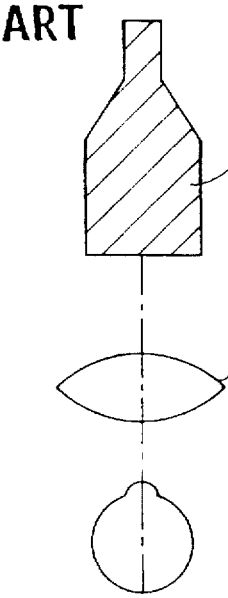
FIGS. 27(a) and 27(b) show the optical system of still another conventional image display apparatus.
Figure 27B:
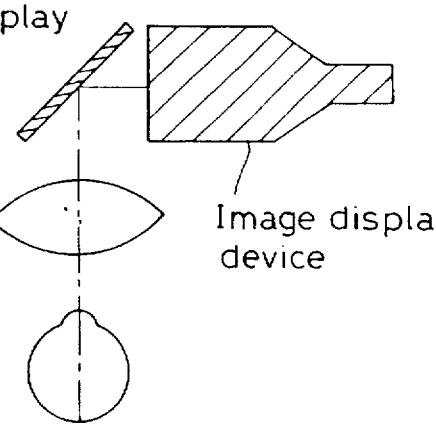
Figure 28:
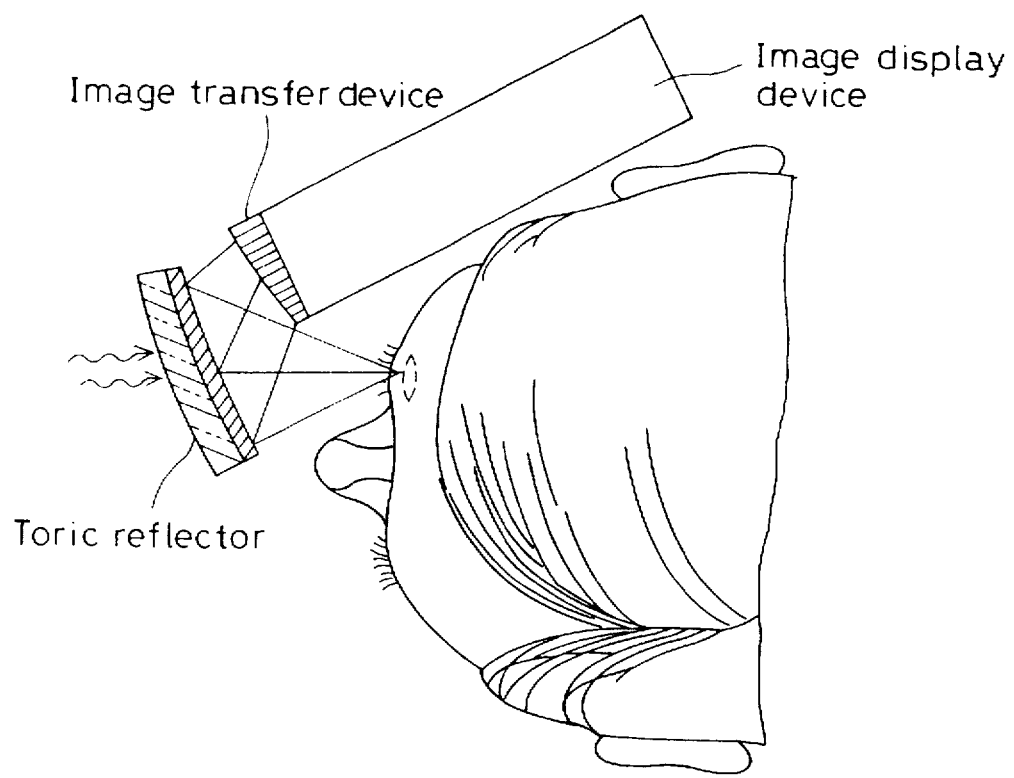
FIG. 28 shows the optical system of a further conventional image display apparatus.

Incidentally, it is possible to form a portable image display apparatus, such as a stationary or head-mounted image display apparatus, which enables the observer to see with both eyes, by preparing an optical system in any of the above-described Examples for each of the left and right eyes, and supporting the two optical systems apart from each other by the interpupillary distance. FIG. 23 shows the whole arrangement of an example of such a portable image display apparatus. A display apparatus body 50 is provided with a pair of left and right display apparatuses arranged as described in any of the above Examples, and two-dimensional image display devices, which are liquid crystal display devices, are disposed at the respective image planes of the two display apparatuses. The apparatus body 50 is provided with a pair of left and right temporal frames 51 which are contiguous with the left and right ends of the apparatus body 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display system on his or her head without feeling uncomfortable.

Further, a speaker 56 is provided on each rear frame 54 to enable the user to enjoy listening to stereophonic sound in addition to image observation. The display apparatus body 50 having the speakers 56 is connected with a reproducing unit 58, e.g., a portable video cassette unit, through an image and sound transmitting cord 57. Therefore, the user can enjoy not only observing an image but also listening to sound with the reproducing unit 58 retained on a desired position, e.g., a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display system may be arranged to receive external radio signals through an antenna connected thereto.

As will be clear from the foregoing description, the present invention makes it possible to provide an image display apparatus, e.g. a head-mounted image display apparatus, which enables observation of a clear image at a wide field angle, and which is extremely small in size and light in weight.

What we claim is:

1. An image display apparatus comprising:

an image display device for displaying an image; and an ocular optical system constructed and arranged to project an image formed by said image display device and to lead the image into an observer's eyeball, said ocular optical system having at least three surfaces, which are defined as first, second and third surfaces in order from an observer's eyeball side, a space between said first and second surfaces and a space between said second and third surfaces being filled with a medium having refractive index larger than 1, said first and second surfaces having different curvatures, said second surface being a reflecting or semitransparent surface which is decentered with respect to an observer's visual axis and has a concave surface directed toward said observer's eyeball, wherein light rays emanating from said image display device enter said observer's eyeball without forming an intermediate image during travel to said observer's eyeball, said light rays being reflected once by said second surface only, and wherein a path of light rays from said image display device is refracted by said third surface, reflected by said second surface, and further refracted by said first surface so as to enter said observer's eyeball, any one of said first, second and third surfaces is an anamorphic surface, and the first, second and third surfaces of said ocular optical system have positive, positive and negative refractive powers, respectively.

2. An image display apparatus according to claim 1, which satisfies the following condition:

$$f_y/f_x > 1 \qquad (1)$$

where $f_y$ is a focal length of said ocular optical system in a plane which contains both said observer's visual axis and a center of said image display device, and $f_x$ is a focal length of said ocular optical system in a plane which perpendicularly intersects the plane containing both said observer's visual axis and the center of said image display device.

3. An image display apparatus comprising:

an image display device for displaying an image; and an ocular optical system constructed and arranged to project an image formed by said image display device and to lead the image into an observer's eyeball, said ocular optical system having at least three surfaces, which are defined as first, second and third surfaces in order from an observer's eyeball side, a space between said first and second surfaces and a space between said second and third surfaces being filled with a medium having refractive index larger than 1, said first and second surfaces having different curvatures, said second surface being a reflecting or semitransparent surface which is decentered with respect to an observer's visual axis and has a concave surface directed toward said observer's eyeball, wherein light rays emanating from said image display device enter said observer's eyeball without forming an intermediate image during travel to said observer's eyeball, said light rays being reflected once by said second surface only, and wherein a path of light rays from said image display device is refracted by said third surface, reflected by said second surface, and further refracted by said first surface so as to enter said observer's eyeball, and which satisfies the following condition:

$$1 < R_{y2}/R_{x2} < 3$$

where $R_{y2}$ is a curvature radius of the second surface of said ocular optical system in a plane containing both said observer's visual axis and a center of said image display device, and $R_{x2}$ is a curvature radius of said second surface in a plane which perpendicularly intersects the plane containing both said observer's visual axis and the center of said image display device.

4. An image display apparatus according to claim 1 or 3, which satisfies the following condition:

$$0.5 < R_{y2}/R_{x2} < 3 \qquad (2)$$

where $R_{y2}$ is a curvature radius of the second surface of said ocular optical system in a plane containing both said observer's visual axis and a center of said image display device, and $R_{x2}$ is a curvature radius of said second surface in a plane which perpendicularly intersects the plane containing both said observer's visual axis and the center of said image display device.

5. An image display apparatus according to claim 4, wherein the curvature radii $R_{x2}$ and $R_{y2}$ of the second surface of said ocular optical system satisfy the following condition:

$$0.5 < R_{y2}/R_{x2} \leq 1 \qquad (4).$$

6. An image display apparatus according to claim 3, which satisfies the following condition:

$$-1 > (\phi_1 + \phi_2)/\phi_3 > -15 \qquad (5)$$

where $\phi_1$, $\phi_2$ and $\phi_3$ are refractive powers of the first, second and third surfaces of said ocular optical system.

7. An image display apparatus according to claim 1 or 3, wherein the first surface of said ocular optical system has a convex surface directed toward the observer's eyeball.

8. An image display apparatus according to claim 1 or 3, wherein the third surface of said ocular optical system has a concave surface directed toward said image display device.

9. An image display apparatus according to claim 1 or 3, which satisfies the following condition:

$$30° < \alpha < 80° \qquad (6)$$

where $\alpha$ is an angle between the second surface of said ocular optical system and said observer's visual axis.

10. An image display apparatus according to claim 1 or 3, wherein a display surface of said image display device is tilted with respect to said observer's visual axis.

11. An image display apparatus comprising:

an image display device for displaying an image; and an ocular optical system constructed and arranged to project an image formed by said image display device and to lead the image into an observer's eyeball, said ocular optical system having at least three surfaces, which are defined as first, second and third surfaces in order from an observer's eyeball side, a space between said first and second surfaces and a space between said second and third surfaces being filled with a medium having refractive index larger than 1, said first and second surfaces having different curvatures, said second surface being a reflecting or semitransparent surface which is decentered with respect to an observer's visual axis and has a concave surface directed toward said observer's eyeball, wherein light rays emanating from said image display device enter said observer's eyeball without forming an intermediate image during travel to said observer's eyeball, said light rays being reflected once by said second surface only, and wherein a path of light rays from said image display device is refracted by said third surface, reflected by said second surface, and further refracted by said first surface so as to enter said observer's eyeball, and said second surface of said ocular optical system is an anamorphic surface.

12. An image display apparatus comprising:

an image display device for displaying an image; and an ocular optical system constructed and arranged to project an image formed by said image display device and to lead the image into an observer's eyeball, said ocular optical system having at least three surfaces, which are defined as first, second and third surfaces in order from an observer's eyeball side, a space between said first and second surfaces and a space between said second and third surfaces being filled with a medium having refractive index larger than 1, said first and second surfaces having different curvatures, said second surface being a reflecting or semitransparent surface which is decentered with respect to an observer's visual axis and has a concave surface directed toward said observer's eyeball, wherein light rays emanating from said image display device enter said observer's eyeball without forming an intermediate image during travel to said observer's eyeball, said light rays being reflected once by said second surface only, and wherein a path of light rays from said image display device is refracted by said third surface, reflected by said second surface, and further refracted by said first surface so as to enter said observer's eyeball, and which satisfies the following condition:

$$1 < R_{y2}/R_{x2} < 3$$

where $R_{y2}$ is a curvature radius of the second surface of said ocular optical system in a plane containing both said observer's visual axis and a center of said image display device, and $R_{x2}$ is a curvature radius of said second surface in a plane which perpendicularly intersects the plane containing both said observer's visual axis and the center of said image display device, and the first, second and third surfaces of said ocular optical system have positive, positive and negative refractive powers, respectively.

13. An image display apparatus comprising:

a face-mounted unit body having an image display device disposed in front of an observer's face with a display surface thereof directed toward an observer's visual axis so that a line normal to the display surface intersects an observer's visual axis;

an ocular optical system having a first surface provided at a position which faces the observer's eyeball, a second surface disposed to face said first surface such that a spacing between said first and second surfaces gradually increases toward said image display device from the observer's visual axis, a third surface provided so that said third surface faces the display surface of said image display device, and that one end of said third surface intersects an extension of said first surface, and the other end of said third surface intersects an extension of said second surface, and a medium which is surrounded by said first, second and third surfaces, and which has a refractive index (n) larger than 1 (n>1); and a support member for supporting said face-mounted unit body on an observer's head so that said face-mounted unit body is held fit to the observer's face, said second surface being a reflecting surface that reflects light rays in said ocular optical system, and said second surface having such a surface configuration that a surface configuration in a plane (YZ-plane) containing light rays turned back by said reflecting surface is different from a surface configuration in a XZ-plane perpendicular said YZ-plane.

14. An image display apparatus according to claim 13, wherein said face-mounted unit body includes a see-through optical element provided at a side of said ocular optical system which is remote from the observer's eyeball, said see-through optical element having a fourth surface disposed according to one of A and B, such that A said fourth surface is in substantially uniform contact with said second surface, and B said fourth surface is proximate to and facing said second surface of said ocular optical system, said see-through optical element further having a medium which has a refractive index (n) larger than 1 (n>1) and a fifth surface provided to face said fourth surface across said medium, and a see-through switching shutter disposed at a position which is on the observer's visual axis, and which faces the fifth surface of said see-through optical element.

15. An image display apparatus according to claim 14, wherein said see-through optical element is provided to face said ocular optical system across an air spacing.

16. An image display apparatus according to claim 14, wherein said see-through optical element is cemented to said ocular optical system.

17. An image display apparatus according to claim 13, wherein said third surface of said ocular optical system has a concave surface directed toward said image display device.

* * * * *

UNITED STATES PATENT AND TRADEMARK OFFICE
CERTIFICATE OF CORRECTION

PATENT NO. : 5,768,024
DATED : June 16, 1998
INVENTOR(S) : Takahashi

It is certified that error appears in the above-identified patent and that said Letters Patent is hereby corrected as shown below:

Column 28,
Line 14, delete "or 3".

Signed and Sealed this

Eighth Day of February, 2005

JON W. DUDAS
*Director of the United States Patent and Trademark Office*